US010132937B2

(12) United States Patent
Tanino et al.

(10) Patent No.: US 10,132,937 B2
(45) Date of Patent: Nov. 20, 2018

(54) METHOD FOR MANUFACTURING THREE-DIMENSIONAL STRUCTURE, METHOD FOR MANUFACTURING SCINTILLATOR PANEL, THREE-DIMENSIONAL STRUCTURE, AND SCINTILLATOR PANEL

(71) Applicant: TORAY INDUSTRIES, INC., Tokyo (JP)

(72) Inventors: Takahiro Tanino, Otsu (JP); Tsubasa Hamano, Otsu (JP); Nobuyasu Fujioka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 252 days.

(21) Appl. No.: 15/034,258

(22) PCT Filed: Nov. 4, 2014

(86) PCT No.: PCT/JP2014/079217
§ 371 (c)(1),
(2) Date: May 4, 2016

(87) PCT Pub. No.: WO2015/068686
PCT Pub. Date: May 14, 2015

(65) Prior Publication Data
US 2016/0282479 A1  Sep. 29, 2016

(30) Foreign Application Priority Data

Nov. 6, 2013  (JP) .................................. 2013-230133

(51) Int. Cl.
*G01T 1/20*  (2006.01)
*C03C 8/16*  (2006.01)
(Continued)

(52) U.S. Cl.
CPC .............. *G01T 1/2002* (2013.01); *C03C 8/16* (2013.01); *C03C 17/04* (2013.01); *G01T 1/20* (2013.01); *G21K 4/00* (2013.01); *G21K 2004/06* (2013.01)

(58) Field of Classification Search
CPC ........... G01T 1/2002; G01T 1/20; G21K 4/00; G21K 2004/06; C03C 8/16; C03C 17/04
(Continued)

(56) References Cited

U.S. PATENT DOCUMENTS 5,712,483 A    1/1998  Boone et al.
5,769,918 A    5/1998  Burt et al.
(Continued)

FOREIGN PATENT DOCUMENTS

JP    63151634       6/1988
JP    02167832 A     6/1990
(Continued)

OTHER PUBLICATIONS

Supplementary European Search Report for Application No. EP 14 85 9766, dated May 2, 2017, 9 pages.
(Continued)

*Primary Examiner* — David Porta
*Assistant Examiner* — Gisselle Gutierrez
(74) *Attorney, Agent, or Firm* — RatnerPrestia

(57) ABSTRACT

The purpose of the present invention is to provide a method for manufacturing a three-dimensional structure, a method for manufacturing a scintillator panel, a three-dimensional structure, and a scintillator panel that enable the type and thickness of a substrate of the scintillator panel to be selected freely. The present invention provides a method for manufacturing a three-dimensional structure, by which a three-
(Continued)

dimensional structure is obtained by forming a glass pattern on a base member and then separating the glass pattern from the base member.

13 Claims, 2 Drawing Sheets

(51) Int. Cl.
    *C03C 17/04*     (2006.01)
    *G21K 4/00*     (2006.01)

(58) Field of Classification Search
    USPC ...................................................... 250/488.1
    See application file for complete search history.

(56) References Cited

U.S. PATENT DOCUMENTS

| | | | | |
|---|---|---|---|---|
| 6,406,832 B1* | 6/2002 | Chou | ............... | C03C 17/04 |
| | | | | 156/247 |
| 6,482,062 B1* | 11/2002 | Yao | ............... | H01J 9/242 |
| | | | | 313/582 |
| 7,157,842 B2* | 1/2007 | Yao | ............... | H01J 9/185 |
| | | | | 313/292 |
| 2011/0227487 A1* | 9/2011 | Nichol | ............... | G02B 6/0018 |
| | | | | 315/158 |
| 2013/0263872 A1 | 10/2013 | Iwamoto | | |
| 2014/0091235 A1* | 4/2014 | Iguchi | ............... | G01T 1/20 |
| | | | | 250/487.1 |
| 2015/0309189 A1* | 10/2015 | Hamano | ............... | G01T 1/2018 |
| | | | | 250/486.1 |

FOREIGN PATENT DOCUMENTS

| | | |
|---|---|---|
| JP | 05060871 | 3/1993 |
| JP | 05188148 | 7/1993 |
| JP | 2002160980 | 6/2002 |
| JP | 2011007552 | 1/2011 |
| JP | 2012106918 | 6/2012 |
| WO | 2012161304 | 11/2012 |

OTHER PUBLICATIONS

International Search Report and Written Opinion of the International Searching Authority for International Application No. PCT/JP2014/079217 dated Feb. 10, 2015.

* cited by examiner

METHOD FOR MANUFACTURING
THREE-DIMENSIONAL STRUCTURE,
METHOD FOR MANUFACTURING
SCINTILLATOR PANEL,
THREE-DIMENSIONAL STRUCTURE, AND
SCINTILLATOR PANEL

CROSS REFERENCE TO RELATED APPLICATIONS

This is the U.S. National Phase application of PCT/JP2014/079217, filed Nov. 4, 2014, and claims priority to Japanese Patent Application No. 2013-230133, filed Nov. 6, 2013, the disclosures of each of these applications being incorporated herein by reference in their entireties for all purposes.

FIELD OF THE INVENTION

The present invention relates to a method for manufacturing a three-dimensional structure, a method for manufacturing a scintillator panel, a three-dimensional structure, and a scintillator panel.

BACKGROUND OF THE INVENTION

Conventionally, X-ray images using films have been widely used in medical settings. However, an X-ray image using a film provides analog image information. Then, in recent years, digital-mode radiation detectors, such as computed radiography (CR) and flat panel radiation detectors (FPDs), have been developed.

In an FPD, a scintillator panel is used for converting a radioactive ray to visible light. A scintillator panel contains an X-ray phosphor such as cesium iodide (CsI). The X-ray phosphor emits visible light in response to the applied X-ray, and the emitted light is converted into an electric signal by a thin film transistor (TFT) or a charge-coupled device (CCD) to thereby convert the information of the X-ray to digital image information. However, an FPD has a problem that the S/N ratio is small. This is attributable to the scattering of the visible light by the phosphor itself upon the emission of light from the X-ray phosphor, and the like. For the purpose of reducing the influences of this light scattering, methods in which a phosphor is filled in cells divided by a barrier rib have been proposed (Patent Documents 1 to 4).

As a conventional method for forming such a barrier rib, a method in which a silicon wafer is processed by etching is known. In this method, however, the size of a scintillator panel that can be formed is restricted by the size of the silicon wafer, and therefore it is impossible to produce a scintillator panel having a large size of, for example, 500 mm square. On the other hand, a technique for manufacturing a scintillator panel using a glass powder-containing paste is also known, in which the scintillator panel is manufactured by processing a barrier rib, which mainly contains a low-softening-point glass containing 2 to 20% by mass of an alkali metal oxide, over a wide area and with high precision (Patent Document 4).

PATENT DOCUMENTS

Patent Document 1: Japanese Patent Laid-open Publication No. 5-60871
Patent Document 2: Japanese Patent Laid-open Publication No. 5-188148
Patent Document 3: Japanese Patent Laid-open Publication No. 2011-7552
Patent Document 4: International Publication No. 2012/161304

SUMMARY OF THE INVENTION

However, in the conventional method for manufacturing a scintillator panel using a glass powder-containing paste, since a pattern including the glass powder-containing paste is formed on a substrate and then the glass powder is sintered by firing to form a barrier rib, it is needed to select, as the substrate, a highly heat-resistant substrate that cannot be burned down or cannot be highly deformed during the firing step. Furthermore, it is also needed to secure the strength of the substrate for preventing the warpage of the substrate during firing, and therefore it is needed to use a thick substrate for securing the high strength of the substrate. As a substrate having high heat resistance and high strength, a substrate mainly made from an inorganic material, e.g., a glass substrate and a ceramic substrate, can be mentioned. However, the substrate made from an inorganic material can absorb X-ray easily, and therefore has a problem that X-ray is absorbed by the substrate before the X-ray reaches a phosphor, resulted in the decrease in luminance. The substrate has a low reflectance, and therefore also has a problem that light emitted upon scintillation is leaked to the substrate side, resulted in the decrease in luminance.

Thus, the object of the present invention is to provide: a method for manufacturing a three-dimensional structure and a three-dimensional structure; and a method for manufacturing a scintillator panel and a scintillator panel, in which the three-dimensional structure is used and the type and thickness of a substrate for the scintillator panel can be selected freely.

The problem can be solved by any one of the following technical means.

(1) A method for manufacturing a three-dimensional structure, including forming a glass pattern on a base member and then separating the glass pattern from the base member.

(2) A method for manufacturing a three-dimensional structure, including:
an application step of applying a glass powder-containing paste A onto the surface of a base member to produce a coating film A;
a pattern formation step of processing the coating film A to produce a pre-firing pattern;
a firing step of firing the pre-firing pattern to produce a post-firing pattern; and
a separation step of separating the post-firing pattern from the base member to manufacture the three-dimensional structure.

(3) A method for manufacturing a three-dimensional structure, including:
a first application step of applying a non-sinterable paste onto the surface of a base member to produce a separation aid layer;
a second application step of applying a glass powder-containing paste A onto the surface of the separation aid layer to produce a coating film A;
a pattern formation step of processing the coating film A to produce a pre-firing pattern;
a firing step of firing the pre-firing pattern and the separation aid layer to produce a post-firing pattern and an unsintered layer, respectively; and a separation step of separating the post-firing pattern and the unsintered layer from the base member to manufacture the three-dimensional structure.

(4) A method for manufacturing a three-dimensional structure, including:

A first application step of applying a non-sinterable paste onto the surface of a base member to produce a separation aid layer;

a second application step of applying a glass powder-containing paste B onto the surface of the separation aid layer to produce a coating film B;

a third application step of applying a glass powder-containing paste A onto the surface of the coating film B to produce a coating film A;

a pattern formation step of processing the coating film A to produce a pre-firing pattern;

a firing step of firing the pre-firing pattern, the coating film B and the separation aid layer to produce a post-firing pattern, a reinforcing layer and an unsintered layer, respectively; and a separation step of separating the post-firing pattern, the reinforcing layer and the unsintered layer from the base member to manufacture the three-dimensional structure.

(5) The method for manufacturing a three-dimensional structure according to any one of items 1 to 4, wherein the glass pattern or the post-firing pattern is a stripe-like, grid-like or honeycomb-like barrier rib.

(6) The method for manufacturing a three-dimensional structure according to any one of items (2) to (5), wherein the pattern formation step is a step including processing the coating film A by photolithography.

(7) The method for manufacturing a three-dimensional structure according to any one of items (2) to (6), wherein, in the glass powder-containing paste A, a glass powder is contained as the main component of inorganic components.

(8) The method for manufacturing a three-dimensional structure according to any one of items (2) to (7), wherein the glass powder is a powder of a low-softening-point glass.

(9) A method for manufacturing a scintillator panel, including a placing step of placing a three-dimensional structure manufactured by a method for manufacturing a three-dimensional structure as recited in any one of items (1) to (8) on a substrate.

(10) The method for manufacturing a scintillator panel according to item (9), additionally including a fixedly installing step of fixedly installing the three-dimensional structure onto the substrate with a resin or an adhesive tape.

(11) The method for manufacturing a scintillator panel according to item (9) or (10), wherein the substrate has a reflectance of 90% or more.

(12) The method for manufacturing a scintillator panel according to anyone of items (9) to (11), wherein the substrate is a white PET film.

(13) A three-dimensional structure manufactured by a method for manufacturing a three-dimensional structure as recited in any one of items (1) to (8).

(14) A scintillator panel manufactured by a method for manufacturing a scintillator panel as recited in any one of items (9) to (12).

(15) A scintillator panel including a substrate, a barrier rib which contains a glass as the main component and an unsintered layer, wherein the unsintered layer is located between the substrate and the barrier rib.

According to the method for manufacturing a three-dimensional structure and the three-dimensional structure of the present invention, it is possible to place a barrier rib having a narrow width on a desired substrate over a large area and with high precision. Therefore, it is possible to select a proper substrate without the limitation with respect to heat resistance and strength, and it is also possible to place a barrier rib having a narrow width on the substrate. That is, a method for manufacturing a scintillator panel whereby a highly bright and clear image can be obtained and a scintillator panel can be provided.

DETAILED DESCRIPTION OF EMBODIMENTS OF THE INVENTION

Hereinbelow, the preferred configurations of a scintillator panel manufactured by the method for manufacturing a scintillator panel of the present invention and a radiation detector manufactured using the scintillator panel will be described with reference to the drawings. However, the present invention is not intended to be limited to the configurations.

Figure 1:
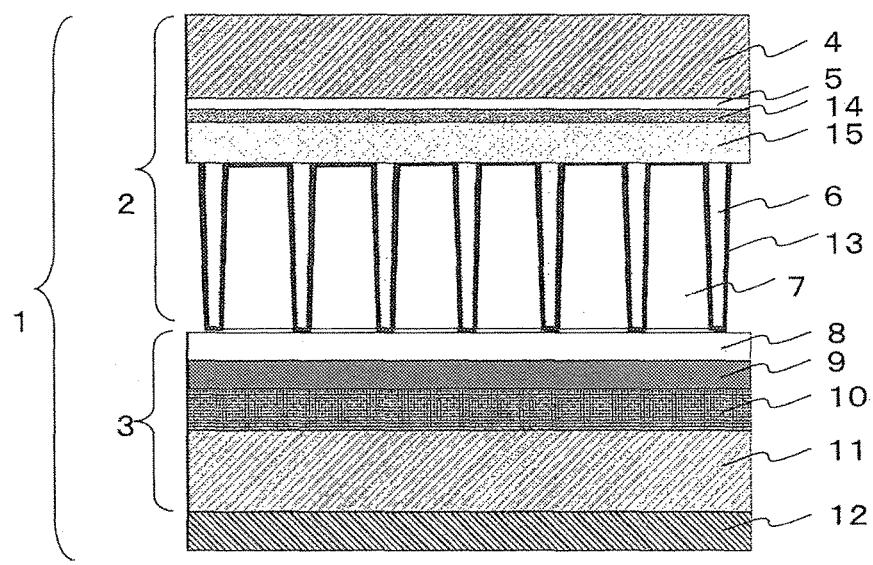
FIG. 1 shows a cross-sectional view schematically illustrating the configuration of a radiation detector equipped with an embodiment of a scintillator panel manufactured by the method for manufacturing a scintillator panel of the present invention.
Figure 2:
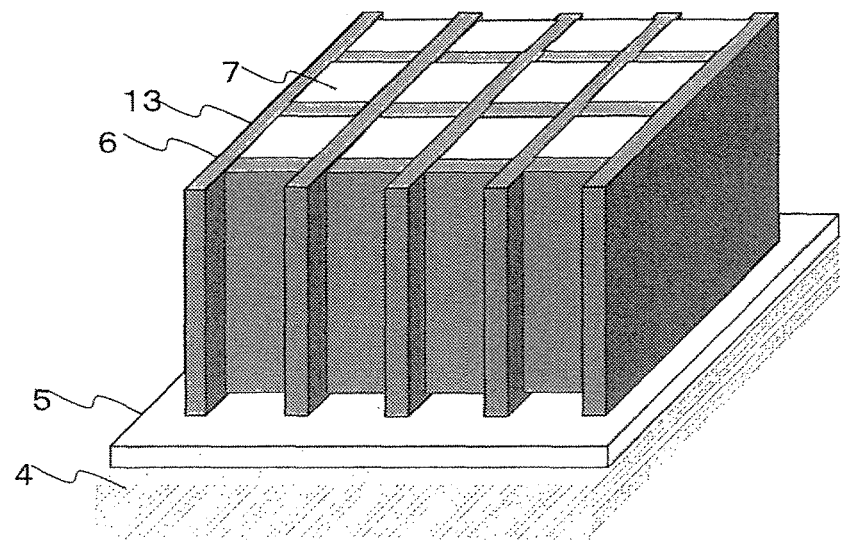
FIG. 2 shows a perspective view schematically illustrating the configuration of an embodiment of a scintillator panel manufactured by the method for manufacturing a scintillator panel of the present invention.

FIG. 1 shows a cross-sectional view schematically illustrating the configuration of a radiation detector equipped with an embodiment of a scintillator panel manufactured by the method for manufacturing a scintillator panel of the present invention. FIG. 2 shows a perspective view schematically illustrating the configuration of an embodiment of a scintillator panel manufactured by the method for manufacturing a scintillator panel of the present invention. A radiation detector 1 includes a scintillator panel 2, an output substrate 3 and a power supply section 12. The scintillator panel 2 includes a scintillator layer 7 composed of a phosphor, and can absorb an energy of an incident radioactive ray (e.g., X-ray) to emit electromagnetic waves (light) having wavelengths ranging from a wavelength of ultraviolet ray to a wavelength of infrared ray, mainly an electromagnetic wave having a wavelength of 300 to 800 nm (i.e., visible light).

The scintillator panel 2 is composed of a flat plate-like substrate 4, a barrier rib 6 for forming divided spaces (i.e., cells) on the substrate 4, and a scintillator layer 7 composed of a phosphor filled in the spaces formed by the barrier rib 6. An adhesive layer 5 may additionally be formed between the substrate 4 and the barrier rib 6 to stably fix (i.e., fixedly install) the barrier rib 6 onto the substrate 4. It is preferred that a reflective film 13 is formed on the surface of the barrier rib 6. It is also preferred that an unsintered layer 14 and a reinforcing layer 15 are formed between the barrier rib 6 and the substrate 4.

The output substrate 3 includes: a substrate 11; and a photoelectric conversion layer 9 and an output layer 10 which are formed on the substrate 11 and in each of which pixels each composed of a photosensor and a TFT are formed two-dimensionally. The light exit surface of the scintillator panel 2 and the photoelectric conversion layer 9 in the output substrate 3 are bonded or closely adhered to each other through a diaphragm layer 8 made from a polyimide resin or the like. In this manner, the radiation detector 1 is manufactured. When light emitted in the scintillator layer 7 reaches the photoelectric conversion layer 9, photoelectric conversion occurs in the photoelectric conversion layer 9 and an electric signal is output through the output layer 10. In an embodiment of the scintillator panel manufactured by the production method of the present invention, since the cells are divided by the barrier rib, each pixel of the photoelectric conversion element can be assigned to each cell of the scintillator panel by making the size and pitch of each pixel of the photoelectric conversion element coincident with those of each cell of the scintillator panel.

A first embodiment of the method for manufacturing a three-dimensional structure of the present invention is characterized in that a glass pattern is formed on a base member and then the glass pattern is separated from the base member. That is, according to the method for manufacturing a three-dimensional structure of the present invention, it is possible to manufacture a three-dimensional structure which is separated from the base member and therefore exists in a separated form. When the three-dimensional structure is a narrow-width barrier rib, the narrow-width barrier rib can be placed on any substrate over a large area and with high precision. Therefore, it is possible to select a proper substrate without the limitation with respect to heat resistance and strength and place the narrow-width barrier rib on the substrate. That is, it is possible to provide: a method for manufacturing a scintillator panel, whereby it becomes possible to take a highly bright and clear image; and a scintillator panel. It is preferred that the glass pattern to be formed on the base member contains a glass as the main component. It is also preferred that the glass pattern is a sintered compact produced by sintering a glass powder.

A second embodiment of the method for manufacturing a three-dimensional structure of the present invention is characterized by including; an application step of applying a glass powder-containing paste A onto the surface of a base member to produce a coating film A; a pattern formation step of processing the coating film A to produce a pre-firing pattern; a firing step of firing the pre-firing pattern to produce a post-firing pattern; and a separation step of separating the post-firing pattern from the base member to manufacture the three-dimensional structure.

In the present invention, it is preferred that the base member is used throughout all of the application step, the pattern formation step and the firing step. When a single base member is used throughout all of these steps and a coating film and a pattern is not separated from the base member between any two of these steps, the change in film thickness caused by the damage to the coating film or the extension of the coating film, the distortion of the pattern and the like rarely occur and the uniformity or position precision of the pattern after firing is likely ensured over a large area.

As the base member, a ceramic plate made from alumina, aluminum nitride, mullite, steatite, silicon nitride, silicon carbide or the like; a glass ceramic plate produced by mixing a ceramic powder with a glass powder and then sintering the mixture; a semiconductor plate made from a semiconductive material such as silicon, germanium, gallium arsenide, gallium phosphide, gallium nitrogen or the like; a metal sheet such as an aluminum sheet, an iron sheet, a copper sheet or the like; a glass plate made from a glass such as quartz, a borosilicate glass and a chemically toughened glass; and the like can be used.

The base member preferably has high heat resistance. The term "a highly heat-resistant base member" as used herein refers to a base member which cannot be burned down in the firing step and has a ratio of volume change of 20% or less at room temperature before and after the firing step. When a highly heat-resistant base member is used, it becomes possible to minimize the influence of the variation in pitches and the like in the firing step. For the purpose of preventing the warpage of the three-dimensional structure or the base member in the firing step, it is preferred that the absolute value $|\alpha s - \alpha g|$ of the difference between $\alpha s$ and $\alpha g$ is $200 \times 10^{-7}$ ($K^{-1}$) or less, more preferably $50 \times 10^{-7}$ ($K^{-1}$) or less, wherein $\alpha s$ ($K^{-1}$) represents the linear expansion coefficient of the base member and $\alpha g$ ($K^{-1}$) represents the linear expansion coefficient of a glass that is a component of the three-dimensional structure.

The three-dimensional structure manufactured by the production method of the present invention is preferably substantially made from an inorganic substance, for the purpose of improving the strength and heat resistance of the three-dimensional structure. The term "an inorganic substance" as used herein refers to one of some simple carbon compounds (e.g., a carbon isotope such as graphite or diamond, a metal carbide, or a metal carbonate) and a compound composed of a non-carbon element. The wording "substantially made from an inorganic substance" as used herein does not mean that the presence of a component other than an inorganic substance is excluded in a strict sense, and the presence of a component other than an inorganic substance, such as an impurity contained in an inorganic substance to be used as a raw material or an impurity remaining in the process of the production of the three-dimensional structure, is acceptable.

The three-dimensional structure manufactured by the production method of the present invention preferably contains a glass as the main component. A three-dimensional structure containing a glass as the main component is highly strong, and therefore does not undergo the change in shape even when the three-dimensional structure is separated from the base member in the separation step. Furthermore, a glass can be sintered at a relatively low temperature compared with ceramic materials and the like, and therefore the three-dimensional structure can be manufactured easily. In the second embodiment of the present invention, for the manufacture of a three-dimensional structure containing a glass as the main component, it is needed that the glass powder-containing paste A used in the application step contains a glass powder as the main component of the inorganic components. The wording "a glass is contained as the main component" as used herein refers to a matter that a glass makes up 50 to 100% by volume of the components of the three-dimensional structure, and the wording "contain(s) (containing) a glass powder as the main component of the inorganic components" as used herein refers to a matter that a glass powder makes up 50 to 100% by volume of the inorganic components contained in the glass powder-containing paste A. If a glass is not the main component, the strength of the three-dimensional structure is deteriorated.

The glass powder to be contained in the glass powder-containing paste A is preferably a glass that can be softened at a firing temperature, more preferably a low-softening-point glass having a softening temperature of 700° C. or lower. When a low-softening-point glass is used, the firing temperature can be decreased and the range of choice of the base member can be extended.

The softening temperature can be determined from a DTA curve obtained by measuring a sample with a differential thermal analyzer (e.g., a differential thermobalance TG8120; Rigaku Corporation) in such a manner that a heat absorption conclusion temperature in an endothermic peak is extrapolated by a tangent method. More specifically, the softening temperature can be determined as follows. An alumina powder is used as a reference sample, and the alumina powder and an inorganic powder, which is a sample to be measured, are analyzed with a differential thermal analyzer while heating the samples from room temperature at a heating rate of 20° C./min, thereby obtaining a DTA curve. A softening point Ts, which is determined from the DTA curve by extrapolating a heat absorption conclusion temperature in an endothermic peak by a tangent method, is defined as a softening temperature.

For producing a low-softening-point glass, a metal oxide selected from the group consisting of lead oxide, bismuth oxide, zinc oxide and an alkali metal oxide which are compounds effective for reducing the softening point of a glass can be used. It is preferred to use an alkali metal oxide for adjusting the softening temperature of a glass. The term "an alkali metal" as used herein refers to a metal selected from the group consisting of lithium, sodium and potassium.

The content of the alkali metal oxide in the low-softening-point glass is preferably 2 to 20% by mass. If the content of the alkali metal oxide is less than 2% by mass, the softening temperature is increased, therefore it is needed to carry out the firing step at a high temperature, and therefore defects are likely to be caused in the three-dimensional structure. If the content of the alkali metal oxide is more than 20% by mass, on the other hand, the viscosity of the glass is unduly decreased in the firing step, and therefore the shape of the resultant post-firing pattern is likely to be distorted.

The low-softening-point glass preferably contains zinc oxide in an amount of 3 to 10% by mass for the purpose of optimizing the viscosity thereof at a high temperature. If the content of zinc oxide in the low-softening-point glass is less than 3% by mass, the viscosity at a high temperature is increased. If the content of zinc oxide is more than 10% by mass, on the other hand, the cost for the production of the low-softening-point glass is increased.

In addition, the low-softening-point glass preferably contains a metal oxide selected from the group consisting of silicon oxide, boron oxide, aluminum oxide and an alkali earth metal oxide for the purpose of adjusting the stability, crystallinity, transparency, a refractive index or thermal expansion properties thereof. The term "an alkali earth metal" as used herein refers to a metal selected from the group consisting of magnesium, calcium, barium and strontium.

Furthermore, the low-softening-point glass may contain titanium oxide, zirconium oxide, bismuth oxide or the like. On the other hand, it is preferred that the low-softening-point glass does not substantially contain lead oxide, because the use of lead oxide may cause environmental pollution.

A preferred example of the compounding ratio of the low-softening-point glass is as follows.

An alkali metal oxide: 2 to 20% by mass
Zinc oxide: 3 to 10% by mass
Silicon oxide: 20 to 40% by mass
Boron oxide: 25 to 40% by mass
Aluminum oxide: 10 to 30% by mass
An alkali earth metal oxide: 5 to 15% by mass The particle diameters of the inorganic powder containing the glass powder can be measured with a particle size distribution analyzer (e.g., MT3300; Nikkiso Co., Ltd.). More specifically, the particle diameters of the inorganic powder can be measured as follows. The inorganic powder is introduced into a water-filled sample chamber in a particle size distribution analyzer and is then subjected to an ultrasonic wave treatment for 300 seconds, and then the particle diameters are measured.

The low-softening-point glass powder preferably has a 50% volume average particle diameter (referred to as "D50", hereinbelow) of 1.0 to 4.0 µm. If the D50 value is less than 1.0 µm, the glass powder is agglomerated and therefore homogeneous dispersibility cannot be achieved, resulted in the deterioration in flow stability of the paste. If the D50 value is more than 4.0 µm, on the other hand, the surface irregularity of the post-firing pattern obtained in the firing step is increased, which may cause the breakage of the three-dimensional structure in a later stage.

The glass powder-containing paste A may contain, as a filler, a glass which cannot be softened at a firing temperature or ceramic particles composed of silicon oxide, aluminum oxide, titanium oxide, zirconium oxide or the like, in addition to a glass which can be softened at the firing temperature, for the purpose of controlling the rate of shrinkage of the pattern in the firing step or for retaining the shape of the finally obtained three-dimensional structure. The content of the filler in the whole of the inorganic components is preferably 50% by volume or less, for the purpose of preventing the decrease in strength of the three-dimensional structure which can be caused as the result of the inhibition of the sintering of the glass powder that can be softened in the firing temperature. The D50 value of the filler is preferably the same as that of the low-softening-point glass powder.

The application step included in an embodiment of the method for manufacturing a three-dimensional structure of the present invention is a step including applying the glass powder-containing paste A onto the whole or a portion of the surface of the base member directly or with other layer interposed therebetween to form a coating film. Examples of the method for applying the glass powder-containing paste A include a screen printing method and a method using a bar coater, a roll coater, a die coater or a blade coater. The thickness of the coating film A can be controlled appropriately by adjusting the compounding ratio of the paste or process conditions.

The coating film A may be a multi-layered one. A multi-layered coating film A can be produced by repeating the application step multiple times. In the multi-layered coating layer A, the compositions of the layers may be the same as or different from each other.

The pattern formation step included in an embodiment of the method for manufacturing a three-dimensional structure of the present invention is a step including processing the coating film produced in the application step to produce a pre-firing pattern. Examples of the method for processing the coating film include a photosensitive paste method (i.e., photolithography), a sand blasting method, an imprinting method and a mechanical processing method. Among these methods, a photosensitive paste method is preferred, because the pre-firing pattern can be produced over a large area and with high yield.

In the present invention, when the structure of the pre-firing pattern formed in the pattern formation step is a stripe-like, grid-like or honeycomb-like (hexagonal) structure, a three-dimensional structure having the corresponding stripe-like, grid-like or honeycomb-like structure can be produced after firing. The three-dimensional structure having the stripe-like, grid-like or honeycomb-like structure can be used as a barrier rib which is a component of a scintillator panel.

The pattern formation step by photolithography can include, for example, an exposure substep of exposing the coating film A produced in the application step with light through a photomask having a predetermined opening and a development substep of dissolving a portion of the exposed coating film A which can be dissolved in a developer in the developer to remove the portion.

The exposure substep is a step for making an arbitrary portion of the coating film A soluble in a developer by photocuring a necessary portion of the coating film A by exposing to light or by photodegrading an unnecessary portion of the coating film A. In the development substep, the developer-soluble portion in the exposed coating film A is dissolved in the developer to remove the portion, thereby producing a pre-firing pattern in which only the necessary portion remains.

In the exposure substep, it is possible to draw a desired pattern directly with laser beam or the like without using a photomask. Examples of an exposure device include a proximity exposure device and a laser exposure device. Examples of the active ray to be emitted in the exposure substep include near-infrared ray, visible ray and ultraviolet ray. Among these rays, ultraviolet ray is preferred. Examples of the light source for the ray include a low-pressure mercury lamp, a high-pressure mercury lamp, an ultra-high-pressure mercury lamp, a halogen lamp and a germicidal lamp. Among these lamps, an ultra-high-pressure mercury lamp is preferred. The conditions for the exposure vary depending on the thickness to be applied, and the exposure is generally carried out for 0.01 to 30 minutes with an ultra-high-pressure mercury lamp having an output power of 1 to 100 mW/cm$^2$.

Examples of the development method to be employed in the development substep include an immersion method, a spray method and a brush method. As the developer, a solvent which can dissolve an unnecessary portion of the exposed coating film A may be selected appropriately, and an aqueous solution containing water as the main component is preferred. For example, when the glass powder-containing paste A contains a polymer having a carboxyl group, an aqueous alkali solution can be selected as the developer. Examples of the aqueous alkali solution include: an aqueous inorganic alkali solution such as aqueous solutions of sodium hydroxide, sodium carbonate and calcium hydroxide; and an aqueous organic alkali solution such as an aqueous solution of tetramethylammonium hydroxide, trimethylbenzylammonium hydroxide, monoethanolamine or diethanolamine. From the viewpoint of easiness of removal in the firing step, an aqueous organic alkali solution is preferred. The concentration of the aqueous alkali solution is preferably 0.05 to 5% by mass, more preferably 0.1 to 2% by mass. If the alkali concentration is unduly low, the unnecessary portion in the exposed coating film A cannot be removed satisfactorily. If the alkali concentration is unduly high, on the other hand, the pre-firing pattern may be detached or corroded. The temperature of development is preferably 20 to 50° C., from the viewpoint of easiness of management of the substep.

For carrying out the processing of the coating film A in the pattern formation step by photolithography, it is required that the glass powder-containing paste A to be applied in the application step is photosensitive. In other words, it is required that the glass powder-containing paste A contains a photosensitive organic component. The content of the organic component in the photosensitive glass powder-containing paste A is preferably 30 to 80% by mass, more preferably 40 to 70% by mass. If the content of the organic component is less than 30% by mass, the dispersibility of the inorganic components in the paste is deteriorated and therefore defects are likely to occur in the firing step. In this case, the viscosity of the paste is increased to deteriorate the coatability of the paste, and the stability of the paste is also deteriorated. If the content of the organic component is more than 80% by mass, on the other hand, the rate of shrinkage of the pattern in the firing step is increased and therefore defects are likely to occur.

For the purpose of almost completely removing the organic component in the firing step and securing the strength of the finally obtained three-dimensional structure, it is preferred that the glass powder to be contained in the photosensitive glass powder-containing paste A has a softening temperature of 480° C. or higher. If the softening temperature is lower than 480° C., the glass powder is softened before the organic component is removed satisfactorily in the firing step, and therefore a carbon component that remains unburned in the sintered glass (also referred to as a "carbon residue") remains, leading to the coloration of the three-dimensional structure. Particularly in the case where the three-dimensional structure is a barrier rib for a scintillator panel, there are concerns about the deterioration in luminance of the scintillator panel and the like.

In the photosensitive glass powder-containing paste A, for the purpose of preventing the occurrence of light scattering upon exposure to light to form a high-resolution pattern, it is preferred that the refractive index n1 of the glass powder and the refractive index n2 of the organic component satisfy the relation represented by the formula: $-0.1 < n1-n2 < 0.1$, more preferably $-0.01 \leq n1-n2 \leq 0.01$, further preferably $-0.005 \leq n1-n2 \leq 0.005$. In this regard, the refractive index of the glass powder can be adjusted appropriately by varying the composition of the metal oxide contained in the glass powder.

The refractive index of the glass powder can be determined by a Becke line detection method. The refractive index of the organic component can be determined by measuring a coating film made from the organic component by ellipsometry. More specifically, the refractive indexes (ng) of the glass powder and the organic component at 25° C. and at a wavelength of 436 nm (g-line) are defined as n1 and n2, respectively.

Examples of the photosensitive organic component to be contained in the photosensitive glass powder-containing paste A include a photosensitive monomer, a photosensitive oligomer and a photosensitive polymer. The terms "a photosensitive monomer", "a photosensitive oligomer" and "a photosensitive polymer" as used herein respectively refer to a monomer, an oligomer and a polymer each of which can cause a reaction such as a photocrosslinking reaction and a photopolymerization reaction upon the irradiation with an active ray to change the chemical structure thereof.

The photosensitive monomer is preferably a compound having an active carbon-carbon unsaturated double bond. Examples of the compound include compounds each having a vinyl group, an acryloyl group, a methacryloyl group or an acrylamide group. For the purpose of increasing the density of photocrosslinking to form a high-resolution pattern, a polyfunctional acrylate compound or a polyfunctional methacrylate compounds is preferred.

As the photosensitive oligomer or the photosensitive polymer, an oligomer or a polymer each having an active carbon-carbon unsaturated double bond and also having a carboxyl group is preferred. The oligomer or the polymer can be produced by, for example, copolymerizing a carboxyl group-containing monomer, e.g., acrylic acid, methacrylic acid, itaconic acid, crotonic acid, maleic acid, fumaric acid, vinyl acetic acid and an acid anhydride thereof, a methacrylic acid ester, an acrylic acid ester, styrene, acrylonitrile, vinyl acetate or 2-hydroxy acrylate. As the method for introducing an active carbon-carbon unsaturated double bond into the oligomer or the polymer, a method can be employed in which acrylic acid chloride, methacrylic acid chloride, acryl chloride, an ethylenically unsaturated compound having a glycidyl group or an isocyanate group, or a carboxylic acid such as maleic acid is reacted with a mercapto group, an amino group, a hydroxyl group or a carboxyl group in the oligomer or the polymer.

When a photosensitive monomer or a photosensitive oligomer each having a urethane bond is used, it becomes possible to produce a glass powder-containing paste A which enables the relaxation of a stress in the initial stage of the firing step and which rarely causes pattern defects in the firing step.

The photosensitive glass powder-containing paste A may contain a photopolymerization initiator, if required. The term "a photopolymerization initiator" as used herein refers to a compound which can generate radicals upon the irradiation with an active ray. Examples of the photopolymerization initiator include benzophenone, methyl o-benzoylbenzoate, 4,4-bis(dimethylamino)benzophenone, 4,4-bis(diethylamino)benzophenone, 4,4-dichlorobenzophenone, 4-benzoyl-4-methyl diphenyl ketone, dibenzyl ketone, fluorenone, 2,2-dimethoxy-2-phenylacetophenone, 2-hydroxy-2-methylpropiophenone, thioxanthone, 2-methylthioxanthone, 2-chlorothioxanthone, 2-isopropylthioxanthone, diethylthioxanthone, benzyl, benzyl methoxyethyl acetal, benzoin, benzoin methyl ether, benzoin butyl ether, anthraquinone, 2-t-butylanthraquinone, anthrone, benzanthrone, dibenzosuberone, methylene anthrone, 4-azidobenzalacetophenone, 2,6-bis(p-azidobenzylidene)cyclohexanone, 2,6-bis(p-azidobenzylidene)-4-methylcyclohexanone, 1-phenyl-1,2-butadione-2-(O-methoxycarbonyl)oxime, 1-phenyl-1,2-propanedione-2-(O-ethoxycarbonyl)oxime, 1,3-diphenylpropanetrione-2-(O-ethoxycarbonyl)oxime, 1-phenyl-3-ethoxypropanetrione-2-(O-benzoyl)oxime, Michler ketone, 2-methyl-1-[4-(methylthio)phenyl]-2-morphorino-1-propanone, 2-benzyl-2-dimethylamino-1-(4-morpholinophenyl)butanone-1, naphthalenesulfonyl chloride, quinolinesulfonyl chloride, N-phenylthioacridone, benzothiazole disulfide, triphenylphosphine, benzoin peroxide, and a combination of a photoreductive pigment such as eosin and methylene blue and a reducing agent such as ascorbic acid and triethanolamine.

When the photosensitive glass powder-containing paste A contains a polymer having a carboxyl group as the photosensitive polymer, the solubility of the paste A in an aqueous alkali solution during the development can be improved. The acid value of the polymer having a carboxyl group is preferably 50 to 150 mgKOH/g. When the acid value is 150 mgKOH/g or less, the development margin becomes wide. When the acid value is 50 mgKOH/g or more, on the other hand, the solubility of the paste A in the aqueous alkali solution cannot be decreased and, as a consequence, a high-resolution pattern can be formed.

The photosensitive glass powder-containing paste A can be produced by formulating various components so as to achieve a predetermined compounding ratio and then mixing and dispersing the components uniformly with a three-roll roller or a kneader.

The viscosity of the photosensitive glass powder-containing paste A can be appropriately adjusted by varying the amount of an inorganic powder, a thickener, an organic solvent, a polymerization inhibitor, a plasticizer, a precipitation preventive agent or the like to be added, preferably within the range from 2 to 200 Pa·s. For example, when the photosensitive glass powder-containing paste A is to be applied onto the base member by a spin coating process, the viscosity is preferably 2 to 5 Pa·s. When the photosensitive glass powder-containing paste A is to be applied onto the base member by a blade coater method or a die coater method, the viscosity is preferably 10 to 50 Pa·s. When the photosensitive glass powder-containing paste A is to be applied by carrying out one round of a screen printing process to produce a coating film having a film thickness of 10 to 20 μm, the viscosity is preferably 50 to 200 Pa·s.

The firing step included in an embodiment of the method for manufacturing a three-dimensional structure of the present invention is a step including firing the pre-firing pattern produced in the pattern formation step to decompose and remove the organic component contained in the glass powder-containing paste A and then softening and sintering the glass powder to produce a post-firing pattern. The conditions for the firing vary depending on the composition of the glass powder-containing paste A and the type of the base member, and the firing can be achieved, for example, in a firing furnace having an air, nitrogen or hydrogen atmosphere. Examples of the firing furnace include a batch-type firing furnace and a belt-type continuous firing furnace. The firing temperature (i.e., the highest temperature in a firing profile) is preferably 500 to 1000° C., more preferably 500 to 800° C., further preferably 500 to 700° C. If the firing temperature is lower than 500° C., the decomposition and removal of the organic component is often insufficient. If the firing temperature is higher than 1000° C., on the other hand, the base member which can be used as a highly heat-resistant base member is limited to a ceramic plate or the like. The time for the firing is preferably 10 to 60 minutes.

The separation step included in an embodiment of the method for manufacturing a three-dimensional structure of the present invention is a step including separating the post-firing pattern produced in the firing step from the base member to manufacture a three-dimensional structure.

A third embodiment of the method for manufacturing a three-dimensional structure of the present invention is characterized by including: a first application step of applying a non-sinterable paste onto the surface of a base member to produce a separation aid layer; a second application step of applying a glass powder-containing paste A onto the surface of the separation aid layer to produce a coating film A; a pattern formation step of processing the coating film A to produce a pre-firing pattern; a firing step of firing the pre-firing pattern and the separation aid layer to produce a post-firing pattern and an unsintered layer, respectively; and a separation step of separating the post-firing pattern and the unsintered layer from the base member to manufacture the three-dimensional structure. That is, this embodiment of the method for manufacturing a three-dimensional structure of the present invention is characterized in that the first application step of applying the non-sinterable paste onto the surface of the base member to produce the separation aid layer is added to the second embodiment of the method for manufacturing a three-dimensional structure of the present invention. The application step in the second embodiment corresponds to the second application step in the third embodiment.

In the present invention, it is preferred that the base member is used throughout all of the first application step, the second application step, the pattern formation step and the firing step.

In the first application step, the separation aid layer is formed on the surface of the base member. This makes it possible to separate the post-firing pattern easily from the base member in the separation step later, and therefore is preferred because the cost is reduced compared with that for a method in which the base member is removed by grinding.

The separation aid layer is produced by applying the non-sinterable paste. The term "a non-sinterable paste" as used herein refers to a paste which contains an inorganic powder incapable of being sintered in the firing step (also referred to as "a non-sinterable inorganic powder", hereinbelow) as the main component of the inorganic component. The wording "the non-sinterable inorganic powder is contained as the main component of the inorganic components" as used herein refers to a matter that the non-sinterable inorganic powder makes up 50 to 100% by volume of the inorganic components contained in the non-sinterable paste. When the non-sinterable paste contains the non-sinterable inorganic powder as the main component of the inorganic components, the fusion of the pattern with the base member in the firing step can be prevented by the action of the separation aid layer, and the post-firing pattern can be separated from unsintered layer easily. The content of the non-sinterable inorganic powder in the inorganic components contained in the non-sinterable paste is preferably 70 to 100% by volume, more preferably 90 to 100% by volume.

Examples of the non-sinterable inorganic powder include a glass powder and a ceramic powder each having a softening temperature higher than the firing temperature. For the purpose of preventing the fusion with the substrate in the firing step, it is preferred that the softening temperature is higher by 50° C. or more than the firing temperature. More specifically, ceramic particles composed of silicon oxide, aluminum oxide, titanium oxide, zirconium oxide, barium titanate, cobalt oxide, nickel oxide or a high-softening-point glass powder is preferred.

The D50 value of the non-sinterable inorganic powder is preferably 0.01 to 20 µm, more preferably 0.05 to 3.0 µm. If the D50 value is less than 0.01 µm, it is often difficult to separate the three-dimensional structure from the base member after the firing step. If the D50 value is more than 20 µm, on the other hand, the three-dimensional structure is unduly separated from the base member, and therefore the pattern is often detached partially during firing.

The shape of the non-sinterable inorganic powder is, for example, an amorphous form, a spherical form, a flat form or a rod-like form.

The non-sinterable paste is required to contain the non-sinterable inorganic powder in an amount of 50% by volume or more relative to the total amount of the inorganic components, but may also contain a glass powder that can be sintered at the firing temperature in an amount that does not adversely affect the properties of the separation aid layer. When the glass powder is contained in a proper amount, the curling or warpage of the edge of the pattern during firing can be prevented.

The non-sinterable paste is composed of: inorganic components, including the non-sinterable inorganic powder which can remain after the firing step; and an organic component which can be thermally decomposed in the firing step. The amount of the organic component to be contained in the non-sinterable paste is preferably 20 to 80% by mass. If the amount of the organic component is less than 20% by mass, the dispersibility of the inorganic components in the paste is deteriorated and therefore defects are likely to occur during the firing step. If the amount of the organic component is more than 80% by mass, on the other hand, the shrinkage during the firing step is increased and therefore defects such as cracks are likely to occur.

As the organic component to be contained in the non-sinterable paste, a binder resin, a curable monomer, a polymerization initiator, a dispersant or an organic solvent is preferred.

Examples of the binder resin include polyvinyl butyral, polyvinyl acetate, polyvinyl alcohol, ethyl cellulose, methyl cellulose, polyethylene, polystyrene, a butadiene/styrene copolymer, polystyrene, polyvinyl pyrrolidone, polyamide, high-molecular-weight polyether, a copolymer of ethylene oxide and propylene oxide, polyacrylamide and an acrylic resin. A photosensitive oligomer or a photosensitive polymer which can be used in the photosensitive glass powder-containing paste can also be used appropriately. The binder resin can contain a silicone resin such as polymethylsiloxane and a polymethylphenylsiloxane. However, the amount of a carbon residue coming from the silicone resin is often increased after firing. Therefore, it is preferred that the content of the silicone resin in the binder resin is 50% by mass or less.

Examples of the method for applying the non-sinterable paste include a screen printing method and a method using a bar coater, a roll coater, a die coater or a blade coater. The separation aid layer can be produced by applying the non-sinterable paste by any one of the methods and then drying the resultant product.

The separation aid layer may be a multi-layered one. The multi-layered separation aid layer can be produced by repeating the first application step multiple times. In the multi-layered separation aid layer, the compositions of the layers may be the same as or different from each other.

As a curable monomer, a monomer having a carbon-carbon unsaturated double bond or a monomer having a hydroxyl group, an isocyanate group or the like is preferred, because the curable monomer is subjected to a reaction such as a crosslinking reaction and a polymerization reaction with light or heat. When the curable monomer is subjected to a reaction such as a crosslinking reaction and a polymerization reaction, the solvent resistance and scratch resistance of the separation aid layer can be improved and therefore the separation aid layer is rarely swollen or detached during the application of other paste onto the surface of the separation aid layer.

The thickness of the separation aid layer is preferably 0.1 to 100 µm, more preferably 0.2 to 50 µm, further preferably 1 to 10 µm. If the thickness of the separation aid layer is less than 0.2 µm, it becomes difficult to separate the three-dimensional structure from the base member after the firing step. If the thickness is more than 50 µm, on the other hand, the three-dimensional structure is unduly separated and therefore the pattern is often detached partially during the firing step.

The unsintered layer can be produced by firing the separation aid layer. The term "an unsintered layer" as used herein refers to a layer in which the non-sinterable inorganic powder is contained as the main component of the inorganic components. The unsintered layer obtained after firing is normally attached to both of the base member and the three-dimensional structure. Therefore, when the three-dimensional structure is separated from the base member, the unsintered layer is divided into a portion located on the base member side and a portion located on the three-dimensional structure. The thickness of the portion that remains on the three-dimensional structure side after the separation is preferably 0.01 to 50 µm, more preferably 0.1 to 20 µm. Under such conditions where the thickness of the portion is less than 0.01 µm, the separation of the three-dimensional structure from the base member often becomes difficult. If the thickness of the portion is more than 50 µm, the non-sinterable inorganic powder is likely to be detached from the three-dimensional structure.

The thickness of the unsintered layer can be determined by observing a cross section of the unsintered layer with a scanning electron microscope (also referred to as a "SEM", hereinbelow) to distinguish the non-sinterable inorganic powder from other inorganic components on the basis of the difference in density in an SEM image and then measuring the thickness of a layer in which the non-sinterable inorganic powder is contained as the main component of the inorganic components. When the glass powder-containing paste A is applied onto the surface of the separation aid layer and then resultant product is fired, there is a possibility that the glass contained in the glass powder-containing paste A penetrates into an area which corresponds to the separation aid layer before the firing. Therefore, the thickness of the unsintered layer tends to be decreased compared with that achieved in the case where a single separation aid layer having the same thickness is applied and then firing is carried out.

When the portion of the unsintered layer located on the three-dimensional structure side is thick, the thickness may be adjusted by removing the portion by ultrasonic cleaning or the like.

A fourth embodiment of the method for manufacturing a three-dimensional structure of the present invention is characterized by including: a first application step of applying a non-sinterable paste onto the surface of a base member to produce a separation aid layer; a second application step of applying a glass powder-containing paste B onto the surface of the separation aid layer to produce a coating film B; a third application step of applying a glass powder-containing paste A onto the surface of the coating film B to produce a coating film A; a pattern formation step of processing the coating film A to produce a pre-firing pattern; a firing step of firing the pre-firing pattern, the coating film B and the separation aid layer to produce a post-firing pattern, a reinforcing layer and an unsintered layer, respectively; and a separation step of separating the post-firing pattern, the reinforcing layer and the unsintered layer from the base member to manufacture the three-dimensional structure. That is, this embodiment of the method for manufacturing a three-dimensional structure of the present invention is characterized in that the second application step of applying the glass powder-containing paste B onto the surface of the separation aid layer to produce the coating film B is added to the third embodiment of the method for manufacturing a three-dimensional structure of the present invention. The second application step in the third embodiment corresponds to the third application step in the fourth embodiment.

By firing the coating film B formed in the second application step to produce the reinforcing layer, the strength of the three-dimensional structure can be improved and the occurrence of defects such as cracking can be prevented during the separation.

In the present invention, it is preferred that the base member is used throughout all of the first application step, the second application step, the third application step, the pattern formation step and the firing step.

Pre-firing may be carried out after the second application step and before the third application step. In this case, in the third application step, the glass powder-containing paste A is applied onto the surface of the pre-fired coating film B. In this case, the arithmetic average surface roughness Ra of the surface of the pre-fired coating film B is preferably 0.01 to 10 µm, more preferably 0.5 to 5 µm. If the Ra value is less than 0.01 µm, the adhesion of the coating film B to the pattern is decreased, for example in the development substep in the pattern formation step, and therefore detachment of the pattern is likely to occur. If the Ra value is more than 10 µm, on the other hand, there is a possibility that cracking in the pattern occurs in the firing step.

The arithmetic average surface roughness Ra of the surface of each of the pre-fired coating film B and the reinforcing layer can be determined by applying the glass powder-containing paste B onto the surface of the base member, firing the resultant product, observing the surface of the fired reinforcing layer with a laser microscope (e.g., VK-9500; KEYENCE CORPORATION) through a 20-power lens, scanning over five points on the surface in a vertically upper direction relative to the base member, and then calculating an average value of Ra values at the points which have been determined by analyzing the image.

The porosity of the reinforcing layer is preferably 0 to 30% by volume, more preferably 0 to 20% by volume. If the porosity is more than 30% by volume, the strength of the reinforcing layer becomes insufficient and therefore the effect of improving the strength of the three-dimensional structure is often reduced. In this case, when the three-dimensional structure is intended to be used as a barrier rib for a scintillator panel, a resin contained in a phosphor paste penetrates into the unsintered layer during a step of filling a phosphor into the barrier rib and therefore separability is often deteriorated.

The porosity of the reinforcing layer can be determined by precisely polishing a cross section of the reinforcing layer, observing the cross section with an SEM, converting the image into a two-tone image composed of an inorganic component part and a void part, and then calculating the ratio of the area of the void part to the area of the cross section of the reinforcing layer.

The reinforcing layer contains a glass. The reinforcing layer containing a glass is highly strong, and therefore can reinforce the three-dimensional structure effectively.

The glass powder-containing paste B is composed of an organic component and inorganic components including a glass powder. The content of the glass powder in the glass powder-containing paste B is preferably 10 to 95% by mass.

The glass powder to be contained in the glass powder-containing paste B is preferably a glass that can be softened at the firing temperature, more preferably a low-softening-point glass having a softening temperature of 700° C. or lower. When the low-softening-point glass is used, the firing temperature can be lowered and the range of choice of the base member can be expanded.

As an inorganic component other than the glass powder, the glass powder-containing paste B may additionally contain a high-softening-point glass powder or a white ceramic powder made from silicon oxide, aluminum oxide, titanium oxide, zirconium oxide, barium titanate or the like appropriately, as long as the properties of the reinforcing layer cannot be deteriorated.

The glass powder and other inorganic powder to be contained in the glass powder-containing paste B can be selected appropriately from inorganic particles having proper softening points, thermal expansion coefficients, chemical stability and refractive indexes, and a glass powder that is the same as that contained in the glass powder-containing paste A can be used.

The volume average particle diameter (also referred to as "D50", hereinbelow) of the inorganic powder which is contained in the glass powder-containing paste B and can be sintered at the firing temperature is preferably 0.05 to 50 μm, more preferably 0.1 to 10 μm. If the D50 value is less than 0.05 μm, the Ra value of the reinforcing layer becomes small, and therefore the three-dimensional structure pattern is likely to be detached during development. If the D50 value is more than 50 μm, on the other hand, the reinforcing layer is likely to contain voids and therefore the effect of improving strength tends to be decreased.

The porosity, the thermal expansion coefficient and the visible light reflectance of the reinforcing layer can be adjusted by properly adjusting the content ratio of the inorganic powder that can be sintered and a filler.

The organic component to be contained in the glass powder-containing paste B is preferably a binder resin, a curable monomer, a polymerization initiator, a dispersant or an organic solvent.

The coating film B can be produced by applying the glass powder-containing paste B and then drying the glass powder-containing paste B by heating to remove an organic solvent in the resultant coating film. With regard to the ratio of the content of the organic component to the content of the inorganic components in a solid matter contained in the coating film B, the content of the organic component is preferably less than 30% by mass. If the content of the organic component in the solid matter is equal to or more than 30% by mass, the concentration of a carbon residue in the reinforcing layer is increased and therefore the reinforcing layer tends to be blackened. Furthermore, the shrinkage of the reinforcing layer upon firing is increased and therefore cracking often occurs in the reinforcing layer.

As the binder resin to be contained in the glass powder-containing paste B, a binder resin of the same type as that of the binder resin contained in the non-sinterable paste can be mentioned. The binder resin is preferably polyvinyl butyral, polyvinyl acetate, polyvinyl alcohol, ethyl cellulose, methyl cellulose, a copolymer of ethylene oxide and propylene oxide, polyacrylamide or acrylic resin which can exhibit good degradability in the firing step. A photosensitive oligomer or a photosensitive polymer which can be used in the photosensitive glass powder-containing paste is also preferred.

When the pre-firing is carried out after the application of the coating film B, it is preferred that the coating film B is formed on the surface of the separation aid layer in a larger area than the application area of the separation aid layer and then pre-firing is carried out to partially bind the base member to the coating film B. This can prevent the detachment of the coating layer B from the base member in the subsequent third application step and pattern formation step and the like. Furthermore, the base member can be separated from the base member and the three-dimensional structure by scribing and fracturing the inside of the separation aid layer from a surface of the base member which is opposed to the three-dimensional structure-formed surface of the base member after the firing step. In this case, the separation can be achieved at an arbitrary timing. This is preferred in, for example, the below-mentioned scintillator panel manufacture, because it becomes possible to fill a phosphor prior to the separation of a barrier rib from the base member and therefore cracking or breakage of the barrier rib is reduced compared with the case where the phosphor is filled after the separation. When this procedure is employed, it is preferred that the thickness of the coating film B is increased compared with that of the separation aid layer.

The thickness of the reinforcing layer is preferably 1 to 500 μm, more preferably 10 to 100 μm. If the thickness of the reinforcing layer is less than 1 μm, the effect of improving the strength of the three-dimensional structure is likely to be reduced. If the thickness of the reinforcing layer is more than 500 μm, on the other hand, the cost of raw materials to be used is increased, resulted in the increase in production cost. When the three-dimensional structure is intended to be used as a scintillator panel, a radioactive ray is absorbed in the reinforcing layer, and therefore luminance is likely to be decreased.

The reinforcing layer may be a multi-layered one. The multi-layered reinforcing layer can be produced by repeating the second application step multiple times. In the multi-layered separation aid layer, the compositions of the layers may be the same as or different from each other. For example, it is possible to laminate a reinforcing layer having a low porosity and a reinforcing layer having a large surface roughness in this order on the separation aid layer, then pre-fire the resultant laminate, and then carry out the third application step and the subsequent steps. In this case, the strength of the finished three-dimensional structure can be improved satisfactorily and the adhesion of the pattern portions during development can also be improved.

The barrier rib manufactured by the production method of the present invention preferably contains 0.1 to 40% by mass of a white pigment as a filler. When the white pigment is contained in an amount of 0.1% by mass or more, the luminance of the scintillator panel can be improved. If the white pigment is contained in an amount of more than 40% by mass, the strength of the barrier rib is deteriorated.

The white pigment is preferably a metal oxide selected from the group consisting of aluminum oxide, zirconium oxide and titanium oxide, from the viewpoint of the further improvement in the luminance.

The white pigment is preferably present in the barrier rib in the form of agglomerated particles of ultrafine particles which have an average particle diameter of 0.005 to 0.08 μm. The average particle diameter of the agglomerated particles of the white pigment is preferably 0.3 to 2 μm, more preferably 0.5 to 1 μm, from the viewpoint of the impartment of high reflectance to the barrier rib. The term "an average particle diameter of the agglomerated particles of the white pigment" as used herein refers to a diameter which is obtained by processing an image observed on an electron microscope or the like and then converting an apparent area of each particle to a circle having the same area as the apparent area. More specifically, the average diameter refers to an average value of the diameters of the agglomerated particles, which is determined by taking an enlarged image of a sample that has been treated by an ion etching method using a transmission electron microscope, sampling 50 agglomerated particles from the image, processing the image to approximate the agglomerated particles to spheres (circles on the image), and then determining the average value of the diameters of the spheres (or the circles).

The method for manufacturing a scintillator panel of the present invention can include a placement step of placing a three-dimensional structure, preferably a barrier rib, manufactured by the method for manufacturing a three-dimensional structure of the present invention on a substrate.

The term "a substrate" as used herein refers to a flat-plate-like support on which the three-dimensional structure is to be placed after the separation of the three-dimensional structure from the base member in the separation step.

By placing the three-dimensional structure, which is manufactured separately from the substrate, on the substrate in a later stage, it becomes possible to select the substrate freely without the limitation with respect to heat resistance and strength. Therefore, for example, in the manufacture of a scintillator panel, a substrate having a small radiation absorption and a high reflectance can be selected.

In the method for manufacturing a scintillator panel of the present invention, the three-dimensional structure, such as a barrier rib, placed on the substrate is preferably fixedly installed onto the substrate more preferably with a resin or an adhesive tape. As an adhesive agent which is used as the resin for the fixed installation, a material including a mixture of an organic resin, such as an acrylic resin, an epoxy resin, a polyester resin, a butyral resin, a polyamide resin and ethyl cellulose resin, with a solvent is preferably used. As the adhesive tape, a tape having the above-mentioned adhesive agent applied thereon or the like can be used, and a double-sided tape having an adhesive agent applied on both surfaces thereof is preferably used.

The three-dimensional structure to be fixedly installed onto the substrate is preferably a barrier rib having an unsintered layer or a reinforcing layer. In this case, it is preferred that the unsintered layer or the reinforcing layer is located between the substrate and the barrier rib. That is, an embodiment of the scintillator panel of the present invention is a scintillator panel including a substrate, a barrier rib containing a glass as the main component and an unsintered layer, wherein the unsintered layer is located between the substrate and the barrier rib.

As the substrate, a substrate made from a material such as a polymer, a ceramic material, a semiconductive material, a metal, a glass or the like each having radiation transmissivity can be used. Examples of the substrate include: a polymer film such as a polyester film, a cellulose acetate film, a polyamide film, a polyimide film, a polycarbonate film and a carbon fiber-reinforced resin sheet; a ceramic substrate such as one made from alumina, aluminum nitride, mullite, steatite, silicon nitride and silicon carbide; a glass ceramic substrate such as one produced by mixing a ceramic powder with a glass powder and then sintering the mixture; a semiconductor substrate made from a semiconductive material such as silicon, germanium, gallium arsenide, gallium phosphide and gallium nitrogen; a metal sheet such as an aluminum sheet, an iron sheet and a copper sheet; a glass plate made from a glass such as quartz, a borosilicate glass and a chemically toughened glass; and a metal sheet or an amorphous carbon substrate each having a metal oxide coating layer. Among these substrates, a polymer film made from a polymeric material is preferred, because the polymer film is composed of a material containing a carbon atom or a hydrogen atom, which has a low atomic number, as the main component and has a high radiation transmittance.

For the purpose of preventing the absorption of a radioactive ray by the substrate, the thickness of the substrate is preferably 1 mm or less.

The substrate preferably has a reflectance of 90% or more. When the reflectance is 90% or more, the luminance of the scintillator panel can be improved. As the substrate having a reflectance of 90% or more, a white PET film which is used as a reflector in a liquid crystal display can be preferably mentioned. The term "a reflectance" as used herein refers to an SCI reflectance at a wavelength of 530 nm as measured with a spectrophotometer (e.g., CM-2600d; KONICA MINOLTA, INC.).

It is also possible to simultaneously achieve both the separation and fixed installation of the three-dimensional structure by pressing the substrate, which has an adhesive agent applied thereon or has a double-sided tape adhered thereonto, against the post-firing pattern produced in the firing step from the side opposed to the base member to thereby adhere the substrate to the post-firing pattern or, alternatively, by applying the adhesive agent onto the surface of the post-firing pattern or attaching the double-sided tape to the surface of the post-firing pattern and then pressing the substrate against the adhesive agent or the double-sided tape to thereby adhere the substrate to the post-firing pattern.

In the barrier rib of the present invention, it is preferred that a reflective film is formed on the surface of the barrier rib, for the purpose of preventing the leakage of light from the barrier rib. An example of the material for the reflective film is a substance through which a radioactive ray can pass and on which light, i.e., an electromagnetic wave emitted by a phosphor and having a wavelength of 300 to 800 nm, can be reflected. A metal such as Ag, Au, Al, Ni or Ti or a metal oxide such as $TiO_2$, $ZrO_2$, $Al_2O_3$ or ZnO is preferred, because the metal or the metal oxide is rarely deteriorated.

When a through-type barrier rib, i.e., a barrier rib in which openings are not covered with the reinforcing layer or the like, is placed on the substrate and then the reflective film is formed, it is possible to simultaneously form reflective films made from the same material on all of inner surfaces of the barrier rib and portions of the substrate on which the barrier rib is not present. When the reflective film is to be formed in a separated barrier rib, on the other hand, the reflective film can be formed only on all of the inner surfaces of the barrier rib. In the case where the reflectance of the substrate is higher than that of the reflective film, it is preferred that the reflective film is formed only on all of the inner surfaces of the barrier rib and the reflective. film is not formed on portions of the substrate on which the barrier rib is not present, for the purpose of effectively utilizing the reflectance of the substrate.

As the method for forming the reflective film, a vacuum film formation method, a plating method, a paste application method and a spray method with a spray can be mentioned.

Spaces to which a phosphor is to be filled can be divided with the barrier rib placed on the substrate. A scintillator panel can be completed by filling a phosphor into the spaces, i.e., cells, to form scintillator layers.

Examples of the phosphor include CsI, $Gd_2O_2S$, $Lu_2O_2S$, $Y_2O_2S$, $LaCl_3$, $LaBr_3$, $LaI_3$, $CeBr_3$, $CeI_3$, $LuSiO_5$ and Ba (Br, F) each having a high rate of conversion of a radioactive ray to visible light.

For the purpose of increasing the luminous efficiency, an activator may be added to the phosphor. Examples of the activator include sodium (Na), indium (In), thallium (Tl), lithium (Li), potassium (K), rubidium (Rb), sodium (Na), terbium (Tb), cerium (Ce), europium (Eu) and praseodymium (Pr). A phosphor produced by doping $Gd_2O_2S$ with Tb (also referred to as "GOS:Tb", hereinbelow) is preferred, because the phosphor has high chemical stability and high luminous efficiency.

As the method for filling the phosphor, a method in which crystalline CsI is deposited under vacuum and a method in which a phosphor slurry prepared by dispersing the phosphor in water is applied, as well as a method in which a phosphor paste prepared by mixing a phosphor powder, ethyl cellulose, an acrylic resin or the like with a solvent such as terpineol is applied by screen printing or with a dispenser can be mentioned.

Figure 3:
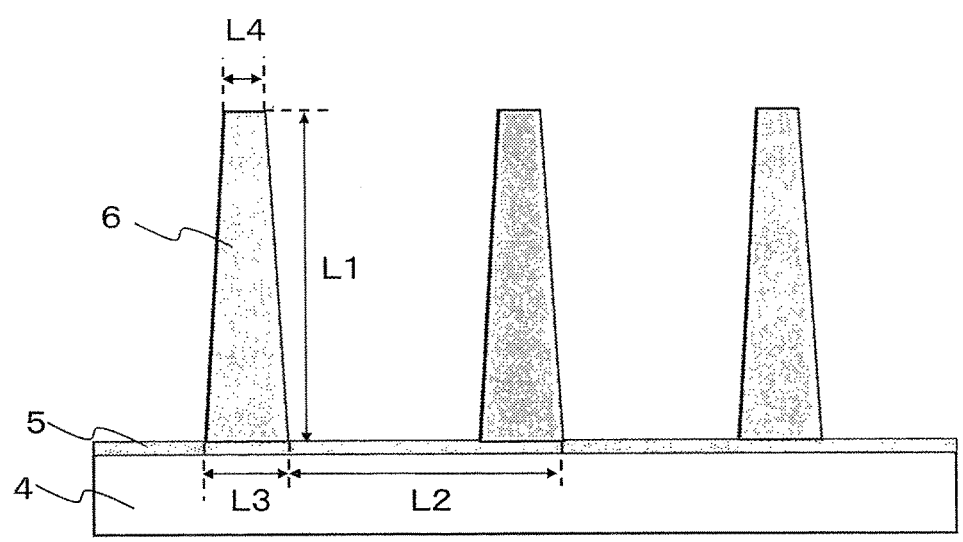
FIG. 3 shows a cross section schematically illustrating the configuration of an embodiment of a scintillator panel manufactured by the method for manufacturing a scintillator panel of the present invention.

FIG. 3 shows a cross section which schematically illustrates the configuration of an embodiment of a scintillator panel manufactured by the method for manufacturing a scintillator panel of the present invention.

The height L1 of a barrier rib 6 is preferably 100 to 3000 µm, more preferably 160 to 500 µm. If the L1 value is more than 3000 µm, the processability for forming the barrier rib is deteriorated. If the L1 value is less than 100 µm, on the other hand, the amount of the phosphor which can be filled is reduced and therefore the luminance of the finished scintillator panel is decreased.

The pitch L2 between adjacent barrier ribs is preferably 30 to 1000 µm. If the L2 value is less than 30 µm, the processability for forming the barrier rib is deteriorated. If the L2 value is more than 1000 µ, on the other hand, the image precision of the finished scintillator panel is decreased.

The bottom width L3 of the barrier rib is preferably 10 to 150 µm, more preferably 20 to 150 µm. If the L3 value is less than 10 µm, defects are likely to be caused in a grid-like pattern during firing. If the L3 value is more than 150 µm, on the other hand, the amount of the phosphor which can be filled in the spaces divided by the barrier rib is reduced and therefore the luminance of the finished scintillator panel is decreased.

The top width L4 of the barrier rib is preferably 5 to 80 µm. If the L4 value is less than 5 µm, the strength of the barrier rib is deteriorated. If the L4 value is more than 80 µm, on the other hand, a region available for extraction of emitted light in the scintillator layer is narrowed.

The aspect ratio (L1/L3) of the height L1 of the barrier rib to the bottom width L3 is preferably 1.0 to 50.0. A barrier rib having a higher aspect ratio (L1/L3) provides a larger space per pixel divided by the barrier rib so as to ensure that a larger amount of a phosphor can be filled in the space.

The aspect ratio (L1/L2) of the height L1 of the barrier rib to the pitch L2 of the barrier rib is preferably 0.5 to 5.0, more preferably 1.0 to 3.5. A barrier rib having a higher aspect ratio (L1/L2) ensures that every pixel is divided with higher definition and a larger amount of the phosphor can be filled in a space per pixel.

Each of the height L1 of the barrier rib and the pitch L2 between adjacent barrier rib can be determined by exposing a cross section of the barrier rib which is perpendicular to the substrate and then observing the cross section with a scanning electron microscope (S2400: Hitachi, Ltd.,). The width of the barrier rib at a contact part between the barrier rib and the substrate is defined as L3. When a barrier rib-reinforcing layer is present between the barrier rib and the substrate, the width of the barrier rib at a contact part between the barrier rib and the barrier rib-reinforcing layer is defined as L3. The width at the topmost part of the barrier rib is defined as L4.

EXAMPLES

The present invention will be described in detail below by way of examples and comparative examples. However, the present invention is not intended to be limited to these examples.
(Raw Materials for Pastes)
Raw materials used for the preparation of pastes are as follows.
Photosensitive monomer M-1: trimethylolpropane triacrylate
Photosensitive monomer M-2: tetrapropylene glycol dimethacrylate
Photosensitive polymer: a product of the addition reaction of 0.4 equivalent of glycidyl methacrylate to carboxyl groups in a copolymer composed of methacrylic acid/methyl methacrylate/styrene in a mass ratio of 40/30/30 (weight average molecular weight: 43000, acid value: 100)
Binder resin: 100 cP ethyl cellulose
Photopolymerization initiator:
2-benzyl-2-dimethylamino-1-(4-morpholinophenyl)butanone-1
(IC369; manufactured by BASF)
Thermal polymerization initiator: V-40
Polymerization inhibitor:
1,6-hexanediol-bis[(3,5-di-t-butyl-4-hydroxyphenyl)propionate]
Ultraviolet ray absorber solution: a 0.3-mass % Sudan IV (manufactured by TOKYO OHKA KOGYO Co., Ltd.) solution in γ-butyrolactone
Viscosity modifier: Flownon EC121 (manufactured by KYOEISHA CHEMICAL CO., LTD.)
Solvent A: γ-butyrolactone
Solvent B: terpineol
Low-softening-point glass powder A: 27% by mass of $SiO_2$, 31% by mass of $B_2O_3$, 6% by mass of ZnO, 7% by mass of $Li_2O$, 2% by mass of MgO, 2% by mass of CaO, 2% by mass of BaO, 23% by mass of $Al_2O_3$, refractive index (ng): 1.56, glass softening temperature: 588° C., linear expansion coefficient: $70 \times 10^{-7}$ $(K^{-1})$, average particle diameter: 2.3 µm
Low-softening-point glass powder B: the same composition as that of the low-softening-point glass powder A, average particle diameter: 0.5 µm
Low-softening-point glass powder C: the same composition as that of the low-softening-point glass powder A, average particle diameter: 1.1 µm
Low-softening-point glass powder D: the same composition as that of the low-softening-point glass powder A, average particle diameter: 40 µm
Low-softening-point glass powder E: 60% by mass of PbO, 15% by mass of $3_2O_3$, 9% by mass of ZnO, 9% by mass of $SiO_2$, 7% by mass of $Li_2O$, refractive index (ng): 1.8, glass softening temperature: 470° C., linear expansion coefficient: $108 \times 10^{-7}$ $(K^{-1})$, average particle diameter: 0.9 µm
Low-softening-point glass powder F: 70% by mass of $Bi_2O_3$, 15% by mass of $B_2O_3$, 9% by mass of $SiO_2$, 4% by mass of ZnO, 2% by mass of MgO, refractive index (ng): 1.8, glass softening
temperature: 520° C., linear expansion coefficient: $92 \times 10^{-7}$ $(K^{-1})$,
average particle diameter: 1.6 µm
High-softening-point glass powder A: 30% by mass of $SiO_2$, 31% by mass of $B_2O_3$, 6% by mass of ZnO, 2% by mass of MgO, 2% by mass of CaO, 2% by mass of BaO, 27% by mass of $Al_2O_3$, refractive index (ng): 1.55, softening temperature: 790° C., thermal expansion coefficient: $32 \times 10^{-7}$ $(K^{-1})$, average particle diameter: 2.3 µm
High-softening-point glass powder B: the same composition as that of the high-softening-point glass powder A, average particle diameter: 15 µm
Silicon oxide powder: SO-E1 manufactured by ADMATECHS CO., LTD., average particle diameter: 0.25 µm
Titanium oxide powder A: ST-21 manufactured by ISHIHARA SANGYO KAISHA, LTD., average particle diameter: 0.02 µm Titanium oxide powder B: MT-600SA manufactured by TAYCA CORPORATION, average particle diameter: 0.05 µm,
(Production of Glass Powder-Containing Paste A)
Four parts by mass of the photosensitive monomer M-1, 6 parts by mass of the photosensitive monomer M-2, 24 parts by mass of the photosensitive polymer, 6 parts by mass of the photopolymerization initiator, 0.2 part by mass of the polymerization inhibitor and 12.8 parts by mass of the ultraviolet ray absorber solution were dissolved in 38 parts by mass of the solvent A under heating at a temperature of 80° C. The resultant solution was cooled, and then 9 parts by mass of the viscosity modifier was added thereto, thereby producing an organic solution 1. An organic coating film, which was produced by applying the organic solution 1 onto a glass plate and then drying the resultant product, had a refractive index (ng) of 1.555.

Thirty parts by mass of the low-softening-point glass powder A and 10 parts by mass of the high-softening-point glass powder A were added to 60 parts by mass of the organic solution 1, and then the resultant mixture was kneaded with a three-roll kneader to produce a glass powder-containing paste A.

(Production of Non-Sinterable Paste 1)

Forty parts by mass of the high-softening-point glass powder was added to 60 parts by mass of the organic solution 1, and then the resultant mixture was kneaded with a three-roll kneader to produce a non-sinterable paste 1.

(Production of Non-Sinterable Paste 2)

Three parts by mass of the binder resin, 1.5 parts by mass of the photosensitive monomer M-1, 0.5 part by mass of the photosensitive monomer M-2 and 0.05 part by mass of the thermal polymerization initiator were dissolved in 55 parts by mass of the solvent B under heating at a temperature of 60° C. The resultant organic solution 2 was cooled, then 40 parts by mass of the silicon oxide powder was added thereto, and then the resultant mixture was kneaded with a three-roll kneader to produce a non-sinterable paste 2.

(Production of Non-Sinterable Paste 3)

One part by mass of the binder resin, 0.5 part by mass of the photosensitive monomer M-1, 0.5 part by mass of the photosensitive monomer M-2 and 0.05 part by mass of the thermal polymerization initiator were dissolved in 78 parts by mass of the solvent B under heating at a temperature of 60° C. The resultant organic solution 3 was cooled, then 20 parts by mass of the titanium oxide powder A was added thereto, and then the resultant mixture was kneaded with a three-roll kneader to produce a non-sinterable paste 3.

(Production of Non-Sinterable Paste 4)

Two parts by mass of the binder resin, 0.5 part by mass of the photosensitive monomer M-1, 0.5 part by mass of the photosensitive monomer M-2 and 0.05 part by mass of the thermal polymerization initiator were dissolved in 67 parts by mass of the solvent B under heating at a temperature of 60° C. The resultant organic solution 4 was cooled, then 30 parts by mass of the titanium oxide powder B was added thereto, and then the resultant mixture was kneaded with a three-roll kneader to produce a non-sinterable paste 4.

(Production of Non-sinterable Paste 5)

Seventy-five parts by mass of the high-softening-point glass powder A was added to 25 parts by mass of the organic solution 2, and then the resultant mixture was kneaded with a three-roll kneader to produce a non-sinterable paste 5.

(Production of Non-Sinterable Paste 6)

Fifty parts by mass of the high-softening-point glass powder B was added to 50 parts by mass of the organic solution 1, and then the resultant mixture was kneaded with a three-roll kneader to produce a non-sinterable paste 6.

(Production of Glass Powder-Containing Paste B1)

Four parts by mass of the binder resin was dissolved in 50 parts by mass of the solvent B under heating at a temperature of 60° C. The resultant organic solution 5 was cooled, then 46 parts by mass of the low-softening-point glass powder A was added thereto, and then the resultant mixture was kneaded with a three-roll kneader to produce a glass powder-containing paste B1. A solid film, which was produced by applying the paste onto a glass plate (PD-200; Asahi Glass Co. Ltd.,) with a slit die coater in such a manner that the resultant film could have a thickness of 30 μm after drying and then firing the resultant product in air at 585° C. for 15 minutes, had a surface roughness Ra of 0.2 μm and a porosity of 0.5%.

(Production of Glass Powder-Containing Paste B2)

Twenty-five parts by mass of the low-softening-point glass powder B was added to 75 parts by mass of the organic solution 5, and then the resultant mixture was kneaded with a three-roll kneader to produce a glass powder-containing paste B2. A solid film, which was produced using the paste and in the same manner as for the glass powder-containing paste B1, had a surface roughness Ra of 0.1 μm and a porosity of 0.2%.

(Production of Glass Powder-Containing Paste B3)

Thirty-five parts by mass of the low-softening-point glass powder C was added to 65 parts by mass of the organic solution 5, and then the resultant mixture was kneaded with a three-roll kneader to produce a glass powder-containing paste B3. A solid film, which was produced using the paste and in the same manner as for the glass powder-containing paste B1, had a surface roughness Ra of 0.2 μm and a porosity of 0.3%.

(Production of Glass Powder-Containing Paste B4)

Sixty parts by mass of the low-softening-point glass powder A was added to 40 parts by mass of the organic solution 1, and then the resultant mixture was kneaded with a three-roll kneader to produce a glass powder-containing paste B4. A solid film, which was produced by applying the paste onto a glass plate (PD-200; Asahi Glass Co. Ltd.,) with a slit die coater in such a manner that the resultant film could have a thickness of 500 μm and then firing the resultant product in air at 585° C. for 15 minutes, had a surface roughness Ra of 0.2 μm and a porosity of 0.5%.

(Production of Glass Powder-Containing Paste B5)

Seventy parts by mass of the low-softening-point glass powder D was added to 30 parts by mass of the organic solution 1, and then the resultant mixture was kneaded with a three-roll kneader to produce a glass powder-containing paste B5. A solid film, which was produced using the paste and in the same manner as for the glass powder-containing paste B4, had a surface roughness Ra of 0.4 μm and a porosity of 1.3%.

(Production of Glass Powder-Containing Paste B6)

Forty-two parts by mass of the low-softening-point glass powder A and 4 parts by mass of the high-softening-point glass A were added to 54 parts by mass of the organic solution 1, and then the resultant mixture was kneaded with a three-roll kneader to produce a glass powder-containing paste B6. A solid film, which was produced using the paste and in the same manner as for the glass powder-containing paste B1, had a surface roughness Ra of 0.5 μm and a porosity of 0.8%.

(Production of Glass Powder-Containing Paste B7)

Thirty-eight parts by mass of the low-softening-point glass powder A and 8 parts by mass of the high-softening-point glass A were added to 54 parts by mass of the organic solution 1, and then the resultant mixture was kneaded with a three-roll kneader to produce a glass powder-containing paste B7. A solid film, which was produced using the paste and in the same manner as for the glass powder-containing paste B1, had a surface roughness Ra of 0.8 μm and a porosity of 1.2%.

(Production of Glass Powder-Containing Paste B8)

Twenty-eight parts by mass of the low-softening-point glass powder A and 18 parts by mass of the high-softening-point glass A were added to 54 parts by mass of the organic solution 1, and then the resultant mixture was kneaded with a three-roll kneader to produce a glass powder-containing paste B8. A solid film, which was produced using the paste and in the same manner as for the glass powder-containing paste B1, had a surface roughness Ra of 2.6 μm and a porosity of 17.8%.

(Production of Glass Powder-Containing Paste B9)

Sixty parts by mass of the low-softening-point glass powder E was added to 40 parts by mass of the organic solution 1, and then the resultant mixture was kneaded with a three-roll kneader to produce a glass powder-containing paste B9. A solid film, which was produced using the paste and in the same manner as for the glass powder-containing paste B1, had a surface roughness Ra of 0.2 μm and a porosity of 0.3%.

(Production of Glass Powder-Containing Paste B10)

Sixty parts by mass of the low-softening-point glass powder F was added to 40 parts by mass of the organic solution 1, and then the resultant mixture was kneaded with a three-roll kneader to produce a glass powder-containing paste B10. A solid film, which was produced using the paste and in the same manner as for the glass powder-containing paste B1, had a surface roughness Ra of 0.4 μm and a porosity of 0.4%.

Example 1

As the base member, a glass plate having a size of 500 mm×500 mm×1.8 mm (PD-200; Asahi Glass Co. Ltd., linear expansion coefficient: $83 \times 10^{-7}$ $(K^{-1})$) was used. The non-sinterable paste 1 was applied onto the surface of the base member with a die coater in such a manner that the resultant film could have a thickness of 50 μm after drying, and then the resultant film was dried to form a separation aid layer. The glass powder-containing paste A was applied onto the surface of the separation aid layer with a die coater in such a manner that the resultant film could have a thickness of 500 μm after drying, and then the resultant film was dried to produce a coating film A. Subsequently, the coating film A was exposed to light at a light exposure amount of 750 mJ/cm$^2$ with an ultra-high-pressure mercury lamp through a photomask having an opening corresponding to a desired pattern (a chrome mask having a grid-like opening with a pitch of 125 μm and a line width of 20 μm). The exposed coating film A was developed with a 0.5% by mass of aqueous monoethanolamine solution so as to remove an unexposed portion in the exposed coating film A, thereby forming a grid-like pre-firing pattern. The grid-like pre-firing pattern was fired in air at 585° C. for 15 minutes to produce a grid-like post-firing pattern.

An adhesive agent was applied onto the surface of a white PET film (Lumirror (registered trademark) E6SQ; Toray Industries, Inc.; reflectance: 97%) having a size of 500 mm×500 mm×0.18 mm to form an adhesive layer. The grid-like post-firing pattern was placed (without being detached from the base member) on the adhesive layer and then compressed, and then the adhesive layer was cured to fixedly install the grid-like post-firing pattern on the adhesive layer. Subsequently, the grid-like post-firing pattern was separated from the base member to produce a product in which a barrier rib was fixedly installed onto the substrate. The grid-like post-firing pattern had an L2 value of 125 μm, an L4 value of 30 μm, an L3 value of 30 82 m, an L1 value of 340 μm and the whole size of 480 mm×480 mm.

A phosphor, which was prepared by mixing a GOS:Tb powder having a particle diameter of 5 μm with a solution of ethyl cellulose in benzyl alcohol, was filled in cells divided by the barrier rib at a volume fraction of 65%, and then the resultant product was dried at 120° C. to complete a scintillator 1.

The scintillator panel 1 was set on an FPD (PaxScan2520; Varian) to manufacture a radiation detector. The radiation detector was irradiated with X-ray at a tube voltage of 60 kVp from the substrate side of the scintillator panel 1, then the amount of light emitted from the scintillator layer was detected with the FPD, and then luminance was evaluated. Image sharpness was also evaluated on the basis of an image of a square wave chart. Both of the luminance and image sharpness of the scintillator panel 1 were good.

Example 2

The examination was carried out in the same manner as in Example 1, except that an alumina substrate (reflectance: 70%) having a size of 500 mm×500 mm×0.3 mm was used as the substrate. The relative value of the luminance was 80 relative to the luminance (i.e., 100) achieved in Example 1, and was therefore good. The image sharpness was also good.

Example 3

The examination was carried out in the same manner as in Example 1, except that PD-200 (reflectance: 15%) which had been ground to a thickness of 0.7 mm was used as the substrate. The relative value of the luminance was 50 relative to the luminance (i.e., 100) achieved in Example 1, and was therefore relatively good. The image sharpness was also good.

Example 4

The non-sinterable paste 2 was screen-printed on the surface of a base member which was of the same type as that used in Example 1 in such a manner that the resultant film could have a thickness of 5 μm after drying, and then dried to form a separation aid layer. The glass powder-containing paste B1 was applied onto the surface of the separation aid layer with a die coater in such a manner that the resultant product could have a thickness of 24 μm after drying, and then the resultant film was dried to form a coating film B. In this procedure, the coating film B was applied so as to have an area that was wider than that of the separation aid layer, and was arranged so as to cover the whole area of the separation aid layer. The coating layer B was pre-fired in air at 585° C. for 15 minutes. Because the coating film B was formed so as to become wider than the separation aid layer as described above, an area at which the base member directly contacted with the coating film B after the pre-firing was fused and therefore the detachment of the coating film B was avoided. Subsequently, the glass powder-containing paste A was applied onto the surface of the pre-fired coating film B with a die coater in such a manner that the resultant product could have a thickness of 500 μm after drying, and then the resultant product was dried to produce a coating film A. Subsequently, the exposure to light, development and firing were carried out in the same manner as in Example 1 to produce a grid-like pattern. A phosphor was filled in the grid-like pattern, and the resultant product was dried. Subsequently, inlying four sides of the separation aid layer were scribed with a glass cutter from the rear surface of the base member and then fractured. In this manner, a portion at which the reinforcing layer and the base member were fused each other was removed and the pattern was separated easily from the base member through the separation aid layer. The pattern had high strength, because the reinforcing layer was provided at the bottom of the pattern. Therefore, the damage of the pattern caused by handling was prevented. The pattern was bonded through a double-sided tape having a thickness of 10 µm in such a manner that the unsintered layer side of the three-dimensional structure faced the white PET film side. In this manner, a scintillator 4 was completed. The relative value of the luminance was 97 relative to the luminance (i.e., 100) achieved in Example 1, and was therefore good. The image sharpness was also good.

Example 5

The non-sinterable paste 3 was screen-printed on the surface of a base member which was of the same type as that used in Example 1 in such a manner that the resultant film could have a thickness of 0.9 µm after drying, and then dried to form a separation aid layer. The glass powder-containing paste B2 was applied onto the surface of the separation aid layer with a die coater in such a manner that the resultant product could have a thickness of 3 µm after drying, and then the resultant film was dried to form a coating film B. Subsequently, pre-firing was carried out in the same manner as in Example 4, then a grid-like pattern and a phosphor layer were formed, then fracturing was carried out to separate the base member from the pattern, and then the pattern was bonded to a white PET film. In this manner, a scintillator 5 was completed. The relative value of the luminance was 98 relative to the luminance (i.e., 100) achieved in Example 1, and was therefore good. The image sharpness was also good.

Example 6

The non-sinterable paste 4 was applied with a die coater onto the surface of a base member which was of the same type as that used in Example 1 in such a manner that the resultant film could have a thickness of 2.2 µm after drying, and then dried to form a separation aid layer. The glass powder-containing paste B3 was applied onto the surface of the separation aid layer with a die coater in such a manner that the resultant product could have a thickness of 13 µm after drying, and then the resultant film was dried to form a coating film B. Subsequently, pre-firing was carried out in the same manner as in Example 4, then a grid-like pattern and a phosphor layer were formed, then fracturing was carried out to separate the base member from the pattern, and then the pattern was bonded to a white PET film. In this manner, a scintillator 6 was completed. The relative value of the luminance was 97 relative to the luminance (i.e., 100) achieved in Example 1, and was therefore good. The image sharpness was also good.

Example 7

The non-sinterable paste 5 was applied with a die coater onto the surface of a base member which was of the same type as that used in Example 1 in such a manner that the resultant film could have a thickness of 10 µm after drying, and then dried to form a separation aid layer. The glass powder-containing paste B1 was applied onto the surface of the separation aid layer with a die coater in such a manner that the resultant product could have a thickness of 24 µm after drying, and then the resultant film was dried to form a coating film B. Subsequently, pre-firing was carried out in the same manner as in Example 4, then a grid-like pattern and a phosphor layer were formed, then fracturing was carried out to separate the base member from the pattern, and then the pattern was bonded to a white PET film. In this manner, a scintillator panel 7 was completed. The relative value of the luminance was 95 relative to the luminance (i.e., 100) achieved in Example 1, and was therefore good. The image sharpness was also good.

Example 8

The non-sinterable paste 6 was applied with a die coater onto the surface of a base member which was of the same type as that used in Example 1 in such a manner that the resultant film could have a thickness of 40 µm after drying, and then dried to form a separation aid layer. The glass powder-containing paste B1 was applied onto the surface of the separation aid layer with a die coater in such a manner that the resultant product could have a thickness of 106 µm after drying, and then the resultant film was dried to form a coating film B. Subsequently, pre-firing was carried out in the same manner as in Example 4, then a grid-like pattern and a phosphor layer were formed, then fracturing was carried out to separate the base member from the pattern, and then the pattern was bonded to a white PET film. In this manner, a scintillator panel 8 was completed. In the scintillator panel, since the separation layer was thick, the non-sinterable inorganic powder that formed the separation layer had a tendency to be separated and scattered upon the application of impact. However, this problem was acceptable. The relative value of the luminance was 94 relative to the luminance (i.e., 100) achieved in Example 1, and was therefore good. The image sharpness was also good.

Example 9

The non-sinterable paste 2 was screen-printed on the surface of a base member which was of the same type as that used in Example 1 in such a manner that the resultant film could have a thickness of 5 µm after drying, and then dried to form a separation aid layer. The glass powder-containing paste B4 was applied onto the surface of the separation aid layer with a die coater in such a manner that the resultant product could have a thickness of 440 µm after drying, and then the resultant film was dried to form a coating film B. Subsequently, pre-firing was carried out in the same manner as in Example 4, then a grid-like pattern and a phosphor layer were formed, then fracturing was carried out to separate the base member from the pattern, and then the pattern was bonded to a white PET film. In this manner, a scintillator panel 9 was completed. The relative value of the luminance was 78 relative to the luminance (i.e., 100) achieved in Example 1. This luminance was relatively good, although X-ray was absorbed and therefore the luminance was decreased because of the large thickness of the reinforcing layer. The image sharpness was also good.

Example 10

The non-sinterable paste 6 was applied with a die coater onto the surface of a base member which was of the same type as that used in Example 1 in such a manner that the resultant film could have a thickness of 50 µm after drying, and then dried to form a separation aid layer. The glass powder-containing paste B5 was applied onto the surface of the separation aid layer with a die coater in such a manner that the resultant product could have a thickness of 220 µm after drying, and then the resultant film was dried to form a coating film B. Subsequently, pre-firing was carried out in the same manner as in Example 4, then a grid-like pattern and a phosphor layer were formed, then fracturing was carried out to separate the base member from the pattern, and then the pattern was bonded to a white PET film. In this manner, a scintillator panel 10 was completed. In the scintillator panel, since the unsintered layer was thick, the inorganic powder that formed the unsintered layer had a tendency to be exfoliated and scattered upon the application of impact. However, this problem was acceptable. The relative value of the luminance was 88 relative to the luminance (i.e., 100) achieved in Example 1. This luminance was good, although X-ray was absorbed and therefore the luminance was decreased slightly because of the large thickness of the reinforcing layer. The image sharpness was also good.

Example 11

The non-sinterable paste 2 was screen-printed on the surface of a base member which was of the same type as that used in Example 1 in such a manner that the resultant film could have a thickness of 5 µm after drying, and then dried to form a separation aid layer. The glass powder-containing paste B6 was applied onto the surface of the separation aid layer with a die coater in such a manner that the resultant product could have a thickness of 24 µm after drying, and then the resultant film was dried and then pre-fired in air at 585° C. for 15 minutes to form a coating film B. Subsequently, the coating film of the glass powder-containing paste A was exposed to light at a light exposure amount of 700 mJ/cm$^2$ with an ultra-high-pressure mercury lamp through a photomask having an opening corresponding to a desired pattern (a chrome mask having a grid-like opening with a pitch of 125 µm and a line width of 20 µm), and then the development and firing were carried out in the same manner as in Example 1 to produce a grid-like post-firing pattern. The grid-like post-firing pattern had an L2 value of 125 µm, an L4 value of 28 µm, an L3 value of 28 µm, an L1 value of 340 µm and the whole size of 480 mm×480 mm. In this manner, a barrier rib having a narrower width compared with the barrier rib manufactured in Example 4 was formed. However, in the barrier rib, the detachment of the pattern did not occur in the development step. It is considered that this is because the surface roughness of the solid film produced after the firing of the glass powder-containing paste B6 was larger compared with that of the glass powder-containing paste B1 and therefore the detachment of the pattern was prevented in the development step. Subsequently, a phosphor layer was formed in the same manner as in Example 4 and then fractured to separate the base member from the pattern, and then the pattern was bonded to a white PET film. In this manner, a scintillator panel 11 was completed. The relative value of the luminance was 105 relative to the luminance (i.e., 100) achieved in Example 1, and was therefore good. The image sharpness was also good.

Example 12

The non-sinterable paste 2 was screen-printed on the surface of a base member which was of the same type as that used in Example 1 in such a manner that the resultant film could have a thickness of 5 µm after drying, and then dried to form a separation aid layer. The glass powder-containing paste B7 was applied onto the surface of the separation aid layer with a die coater in such a manner that the resultant product could have a thickness of 26 µm after drying, and then the resultant film was dried and then pre-fired in air at 585° C. for 15 minutes to form a coating film B. Subsequently, the coating film of the glass powder-containing paste A was exposed to light at a light exposure amount of 650 mJ/cm$^2$ with an ultra-high-pressure mercury lamp through a photomask having an opening corresponding to a desired pattern (a chrome mask having a grid-like opening with a pitch of 125 µm and a line width of 20 µm), and then the development and firing were carried out in the same manner as in Example 1 to produce a grid-like post-firing pattern. The grid-like post-firing pattern had an L2 value of 125 µm, an L4 value of 25 µm, an L3 value of 25 µm, an L1 value of 340 µm and the whole size of 480 mm×480 mm. In this manner, a barrier rib having a narrower width compared with the barrier rib manufactured in Example 11 was formed. However, in the barrier rib, the detachment of the pattern did not occur in the development step. Subsequently, a phosphor layer was formed in the same manner as in Example 11 and then fractured to separate the base member from the pattern, and then the pattern was bonded to a white PET film. In this manner, a scintillator panel 12 was completed. The relative value of the luminance was 111 relative to the luminance (i.e., 100) achieved in Example 1, and was therefore good. The image sharpness was also good.

Example 13

The non-sinterable paste 2 was screen-printed on the surface of a base member which was of the same type as that used in Example 1 in such a manner that the resultant film could have a thickness of 5 µm after drying, and then dried to form a separation aid layer. The glass powder-containing paste B8 was applied onto the surface of the separation aid layer with a die coater in such a manner that the resultant product could have a thickness of 29 µm after drying, and then the resultant film was dried and then pre-fired in air at 585° C. for 15 minutes to form a coating film B. Subsequently, the coating film of the glass powder-containing paste A was exposed to light at a light exposure amount of 600 mJ/cm$^2$ with an ultra-high-pressure mercury lamp through a photomask having an opening corresponding to a desired pattern (a chrome mask having a grid-like opening with a pitch of 125 µm and a line width of 20 µm), and then the development and firing were carried out in the same manner as in Example 1 to produce a grid-like post-firing pattern. The grid-like post-firing pattern had an L2 value of 125 an L4 value of 20 an L3 value of 20 an L1 value of 340 µm and the whole size of 480 mm×480 mm. In this manner, a barrier rib having a narrower width compared with the barrier rib manufactured in Example 12 was formed. However, in the barrier rib, the detachment of the pattern did not occur in the development step. Subsequently, a phosphor layer was formed in the same manner as in Example 11 and then fractured to separate the base member from the pattern, and then the pattern was bonded to a white PET film. In this manner, a scintillator panel 13 was completed. In the scintillator panel, although ethyl cellulose contained in the phosphor paste penetrated into the unsintered layer in the phosphor filling step and therefore the separability of the unsintered layer was slightly deteriorated because voids in the reinforcing layer were large, the unsintered layer was able to be separated. The relative value of the luminance was 122 relative to the luminance (i.e., 100) achieved in Example 1, and was therefore extremely good. The image sharpness was also good.

Example 14

The non-sinterable paste 2 was screen-printed on the surface of a base member which was of the same type as that used in Example 1 in such a manner that the resultant film could have a thickness of 5 µm after drying, and then dried to form a separation aid layer. The glass powder-containing paste B9 was applied onto the surface of the separation aid layer with a die coater in such a manner that the resultant product could have a thickness of 24 µm after drying, and then the resultant film was dried to form a coating film B. Subsequently, the coating film B was pre-fired, then a grid-like pattern and a phosphor layer were formed and then fractured to separate the base member from the pattern, and then the pattern was bonded to a white PET film in the same manner as in Example 4. In this manner, a scintillator panel 14 was completed. The relative value of the luminance was 90 relative to the luminance (i.e., 100) achieved in Example 1. The luminance had a tendency to be slightly decreased, because a carbon residue in the reinforcing layer was increased due to the influence of the absorption of X-ray by lead and the decrease in the softening point, and therefore the carbon residue blacked the scintillator panel. However, the luminance was still good. The image sharpness was also good.

Example 15

The non-sinterable paste 2 was screen-printed on the surface of a base member which was of the same type as that used in Example 1 in such a manner that the resultant film could have a thickness of 5 µm after drying, and then dried to form a separation aid layer. The glass powder-containing paste B10 was applied onto the surface of the separation aid layer with a die coater in such a manner that the resultant product could have a thickness of 24 µm after drying, and then the resultant film was dried to form a coating film B. Subsequently, the coating film B was pre-fired, then a grid-like pattern and a phosphor layer were formed and then fractured to separate the base member from the pattern, and then the pattern was bonded to a white PET film in the same manner as in Example 4. In this manner, a scintillator panel 15 was completed. The relative value of the luminance was 96 relative to the luminance (i.e., 100) achieved in Example 1, and was therefore good. The image sharpness was also good.

Example 16

The non-sinterable paste 2 was screen-printed on the surface of a base member which was of the same type as that used in Example 1 in such a manner that the resultant film could have a thickness of 5 µm after drying, and then dried to form a separation aid layer. The glass powder-containing paste B1 was applied onto the surface of the separation aid layer with a die coater in such a manner that the resultant product could have a thickness of 24 µm after drying, and then the resultant film was dried to form a first-layer coating film B. Subsequently, the glass powder-containing paste B8 was screen-printed on the surface of the first-layer coating film B in such a manner that the resultant film could have a thickness of 29 µm after drying, and then dried to form a second-layer coating film B. Subsequently, the resultant film was pre-fired, then a grid-like pattern and a phosphor layer were formed and then fractured to separate the base member from the pattern, and then the pattern was bonded to a white PET film in the same manner as in Example 13. In this manner, a scintillator panel 16 was completed. The relative value of the luminance was 119 relative to the luminance (i.e., 100) achieved in Example 1, and was therefore extremely good. In the scintillator panel, unlike Example 13, a reinforcing layer having a lower porosity was formed under a reinforcing layer having a higher porosity, and therefore ethyl cellulose contained in the phosphor paste did not penetrate into the unsintered layer during the phosphor filling step, and the separability was also good. Furthermore, the image sharpness was also good.

Example 17

A scintillator panel 17 was completed in the same manner as in Example 4, except that a glass plate (Eagle-XG; Corning; linear expansion coefficient: $32\times10^{-7}$ $(K^{-1})$) having a size of 500 mm×500 mm×0.7 mm was used as the base member. The relative value of the luminance was 97 relative to the luminance (i.e., 100) achieved in Example 1, and was therefore good. The image sharpness was also good.

Comparative Example 1

A grid-like post-firing pattern was formed in the same manner as in Example 1, except that PD-200 was used as the substrate and the glass powder-containing paste A was applied directly onto the surface of the substrate. In this manner, a substrate having a barrier rib fixedly-installed thereon was manufactured. A phosphor was filled into cells that were divided by the barrier rib at a volume fraction of 65% in the same manner as in Example 1, and then the resultant product was dried at 120° C. to complete a scintillator panel 2. A radiation detector was manufactured using the scintillator panel 2, and the evaluation was carried out in the same manner as in Example 1. The image sharpness was at the same level as that in Example 1. However, the relative value of the luminance of the scintillator panel was as extremely low as 15 relative to the luminance (i.e., 100) achieved in Example 1, and the scintillator panel was not therefore acceptable for practical use. It is considered that this luminance decrease was attributable to the fact that X-ray was absorbed by the substrate and the fact that the reflectance of the substrate was low and therefore light emitted upon scintillation was leaked into the substrate side.

Comparative Example 2

It was attempted to form a barrier rib in the same manner as in Comparative Example 1, except that E6SQ was used as the substrate. However, a pre-firing pattern was collapsed upon the burning off of the E6SQ, which was a white PET film, in the firing step and therefore the evaluation was impossible to do.

Comparative Example 3

E6SQ was used as the substrate, a phosphor prepared by mixing a gadolinium oxysulfide powder having a particle diameter of 5 µm with a solution of ethyl cellulose in benzyl alcohol was applied onto the surface of the substrate to form a phosphor layer having a thickness of 340 µm. In this manner, a scintillator panel 3 without a barrier rib was completed. A radiation detector was manufactured using the scintillator panel 3, and the evaluation was carried out in the same manner as in Example 1. The relative value of the luminance was 145 relative to the luminance (i.e., 100) achieved in Example 1, and was therefore good. However, the image sharpness was extremely poor and the scintillator panel was therefore not acceptable for practical use.

Comparative Example 4

The examination was carried out in the same manner as in Comparative Example 3, except that the thickness of a phosphor layer was adjusted to 50 μm. The relative value of the luminance was as low as 30 relative to the luminance (i.e., 100) achieved in Example 1, and the image sharpness was unsatisfactory. Therefore, the scintillator panel was not suitable for practical use.

From the above-mentioned results, it is clearly found that a scintillator panel equipped with a barrier rib which is manufactured by the production method of the present invention is useful for the significant improvement in luminance and image sharpness in a radiation detector.

DESCRIPTION OF REFERENCE SIGNS

1: Radiation detector
2: Scintillator panel
3: Output substrate
4: Substrate
5: Adhesive layer
6: Barrier rib
7: Scintillator layer
8: Diaphragm layer
9: Photoelectric conversion layer
10: Output layer
11: Substrate
12: Power supply section
13: Reflective film
14: Unsintered layer
15: Reinforcing layer The present invention can be advantageously used as a scintillator panel which constitutes a radiation detector used in a medical diagnostic system, a non-destructive inspection device and the like.

The invention claimed is:

1. A method for manufacturing a three-dimensional structure, comprising:
   a first application step of applying a non-sinterable paste onto the surface of a base member to produce a separation aid layer;
   a second application step of applying a glass powder-containing paste A onto the surface of the separation aid layer to produce a coating film A;
   a pattern formation step of processing the coating film A to produce a pre-firing pattern;
   a firing step of firing the pre-firing pattern and the separation aid layer to produce a post-firing pattern and an unsintered layer, respectively; and
   a separation step of separating the post-firing pattern and the unsintered layer from the base member to manufacture the three-dimensional structure.

2. A method for manufacturing a three-dimensional structure, comprising:
   A first application step of applying a non-sinterable paste onto the surface of a base member to produce a separation aid layer;
   a second application step of applying a glass powder-containing paste B onto the surface of the separation aid layer to produce a coating film B;
   a third application step of applying a glass powder-containing paste A onto the surface of the coating film B to produce a coating film A;
   a pattern formation step of processing the coating film A to produce a pre-firing pattern;
   a firing step of firing the pre-firing pattern, the coating film B and the separation aid layer to produce a post-firing pattern, a reinforcing layer and an unsintered layer, respectively; and
   a separation step of separating the post-firing pattern, the reinforcing layer and the unsintered layer from the base member to manufacture the three-dimensional structure.

3. The method for manufacturing a three-dimensional structure according to claim 1, wherein the glass pattern or the post-firing pattern is a stripe-like, grid-like or honeycomb-like barrier rib.

4. The method for manufacturing a three-dimensional structure according to claim 1, wherein the pattern formation step is a step comprising processing the coating film A by photolithography.

5. The method for manufacturing a three-dimensional structure according to claim 1, wherein, in the glass powder-containing paste A, a glass powder is contained as the main component of inorganic components.

6. The method for manufacturing a three-dimensional structure according to claim 1, wherein the glass powder is a powder of a low-softening-point glass.

7. A method for manufacturing a scintillator panel, comprising a placing step of placing a three-dimensional structure manufactured by a method for manufacturing a three-dimensional structure as recited in claim 1 on a substrate.

8. The method for manufacturing a scintillator panel according to claim 7, additionally comprising a fixedly installing step of fixedly installing the three-dimensional structure onto the substrate with a resin or an adhesive tape.

9. The method for manufacturing a scintillator panel according to claim 7, wherein the substrate has a reflectance of 90% or more.

10. The method for manufacturing a scintillator panel according to claim 7, wherein the substrate is a white PET film.

11. A three-dimensional structure manufactured by a method for manufacturing a three-dimensional structure as recited in claim 1.

12. A scintillator panel manufactured by a method for manufacturing a scintillator panel as recited in claim 7.

13. A scintillator panel comprising a substrate, a barrier rib which contains a glass as the main component and an unsintered layer, wherein the unsintered layer is located between the substrate and the barrier rib.

* * * * *